US010160469B2

(12) United States Patent
Grou

(10) Patent No.: US 10,160,469 B2
(45) Date of Patent: Dec. 25, 2018

(54) SYSTEM FOR TRANSPORTING AND TRANSFERRING A MOVABLE RACK ASSEMBLY AND TRANSFER CART ASSEMBLY THEREFOR

(71) Applicant: STERIS Inc., Temecula, CA (US)

(72) Inventor: Francis Grou, Quebec (CA)

(73) Assignee: STERIS Inc., Temecula, CA (US)

( * ) Notice: Subject to any disclaimer, the term of this patent is extended or adjusted under 35 U.S.C. 154(b) by 0 days.

(21) Appl. No.: 15/636,185

(22) Filed: Jun. 28, 2017

(65) Prior Publication Data

US 2018/0001919 A1 Jan. 4, 2018

Related U.S. Application Data

(60) Provisional application No. 62/357,531, filed on Jul. 1, 2016.

(51) Int. Cl.
*B65G 67/02* (2006.01)
*B62B 3/02* (2006.01)
*B62B 3/00* (2006.01)

(52) U.S. Cl.
CPC ............... *B62B 3/02* (2013.01); *B62B 3/005* (2013.01); *B62B 2205/20* (2013.01); *B62B 2205/30* (2013.01)

(58) Field of Classification Search
CPC ...... B62B 3/148; B65G 69/003; B65G 69/006
USPC ................... 280/33.995, 79.3; 414/401, 402
See application file for complete search history.

(56) References Cited

U.S. PATENT DOCUMENTS

| | | | |
|---|---|---|---|
| 2,336,402 A | 12/1943 | Kaiser | 4/152 |
| 3,261,650 A | 7/1966 | Stromqvist | 312/236 |
| 3,391,409 A | 7/1968 | Gatley | 4/151 |
| 3,456,763 A * | 7/1969 | Close | B62B 3/148 186/65 |
| 3,869,052 A | 3/1975 | Leahy | 214/38 B |
| 3,905,662 A | 9/1975 | Richmond | 312/250 |
| 4,621,969 A | 11/1986 | Berghäll et al. | |
| 4,993,444 A | 2/1991 | Toriyama et al. | 134/181 |
| 5,072,960 A | 12/1991 | Sperko | 280/47.34 |

(Continued)

OTHER PUBLICATIONS

International Search Report and Written Opinion issued in corresponding International Patent Application No. PCT/US2017/039867 dated Sep. 6, 2017.

*Primary Examiner* — Jeffrey J Restifo
(74) *Attorney, Agent, or Firm* — Kusner & Jaffe

(57) ABSTRACT

A system is provided for transporting a movable rack assembly and transferring the movable rack assembly between a transfer cart assembly and a station. The system includes a rack support assembly, a rack locking assembly, a docking enabling assembly, and an anti-return mechanism. The rack support assembly is configured to securely and movably support the movable rack assembly thereon. The rack locking assembly is configured to lock the movable rack assembly to the rack support assembly. The docking enabling assembly is configured to enable temporary docking of the transfer cart assembly with the station for the transfer of the movable rack assembly to the station or the receipt of the movable rack assembly from the station. The anti-return mechanism is configured to actively inhibit removal of the movable rack assembly from the station when the transfer cart assembly is not secured to the station by a cart locking assembly.

15 Claims, 17 Drawing Sheets

(56) References Cited

U.S. PATENT DOCUMENTS

| | | | |
|---|---|---|---|
| 5,144,369 A * | 9/1992 | Benedict | G03G 15/0126 399/119 |
| 5,224,812 A * | 7/1993 | Oslin | A21B 3/07 414/401 |
| 5,360,307 A | 11/1994 | Schemm et al. | 414/343 |
| 5,364,219 A * | 11/1994 | Takahashi | H01L 21/67724 118/719 |
| 5,441,376 A * | 8/1995 | Napierkowski | B01J 3/002 14/71.1 |
| 5,476,282 A | 12/1995 | Dahl | 280/651 |
| 5,488,965 A | 2/1996 | Hori | 134/180 |
| 5,553,986 A | 9/1996 | Napierkowski et al. | 414/401 |
| 5,570,988 A | 11/1996 | Gallaway et al. | 414/498 |
| 5,749,385 A | 5/1998 | Rochette et al. | 134/199 |
| 5,810,541 A | 9/1998 | Casey et al. | |
| 6,036,219 A | 3/2000 | Oefelein et al. | 280/638 |
| 6,089,812 A * | 7/2000 | Junker | B23Q 7/1436 414/396 |
| 6,869,029 B2 | 3/2005 | Ochoa, Sr. et al. | 239/380 |
| 7,080,844 B2 * | 7/2006 | Espejo | B62B 3/027 280/33.995 |
| 7,314,238 B2 | 1/2008 | Robert | 285/103 |
| 7,673,889 B2 * | 3/2010 | Wells | B60P 1/6463 187/244 |
| 7,896,977 B2 | 3/2011 | Gillum et al. | 134/56 |
| 8,113,222 B2 | 2/2012 | Bertsch et al. | 134/181 |
| 8,211,243 B2 | 7/2012 | Delgado | 134/56 |
| 8,282,741 B2 | 10/2012 | Bertsch et al. | 134/18 |
| 8,303,234 B2 * | 11/2012 | Ezure | H05K 13/02 414/396 |
| 8,333,207 B2 | 12/2012 | Calhoun et al. | 134/172 |
| 2003/0163867 A1 | 9/2003 | Zhou | 4/599 |
| 2006/0178246 A1 | 8/2006 | Tjettild | 482/24 |
| 2006/0280580 A1 | 12/2006 | Lutz | |
| 2011/0146734 A1 | 6/2011 | Rappette | 134/198 |
| 2012/0279535 A1 | 11/2012 | Robert et al. | 134/198 |
| 2012/0285491 A1 | 11/2012 | Blanchard et al. | 134/25.2 |
| 2013/0062300 A1 | 3/2013 | Drake | 211/183 |
| 2014/0100715 A1 | 4/2014 | Mountz et al. | |

\* cited by examiner

SYSTEM FOR TRANSPORTING AND TRANSFERRING A MOVABLE RACK ASSEMBLY AND TRANSFER CART ASSEMBLY THEREFOR

RELATED APPLICATIONS

This application claims the benefit of U.S. Provisional Application No. 62/357,531, filed on Jul. 1, 2016, which is fully incorporated herein by reference.

FIELD OF THE INVENTION

The present invention relates generally to the art of safe rack transport and transfer, and, more particularly, to systems for transporting and transferring racks between transfer carts and processing or conveyor stations.

BACKGROUND OF THE INVENTION

Racks are often used to position instruments therein for various purposes. For example, medical instruments are required to be cleaned and sanitized after every use. An initial cleaning is performed to remove large debris from the instruments. After the initial cleaning, the instruments are more thoroughly washed and sterilized by specialized washers. Instruments racks have been developed for the washers to enable cleaning and sterilization of several instruments at one time.

Transfer carts are typically used to transport instrument racks between cleaning stations (e.g., a manual cleaning station, a washer, a sink conveyor, etc.) Such transfer carts and cleaning stations typically include rollers to allow an instrument rack to be easily transferred or received.

Many transfer carts possess a manual locking mechanism to ensure that an instrument rack is securely positioned on the transfer cart during movement of the transfer cart. However, an operator of a transfer cart may forget to manually lock the instrument rack to the transfer cart. As an unlocked instrument rack may rest on the rollers of the transfer cart, the rack could easily slide off of the cart during movement of the cart.

Many transfer carts also include a docking mechanism that enables an operator to manually lock the cart to a cleaning station. The docking mechanism inhibits the cart from moving while an instrument rack is being transferred from or received by the cart. However, an operator may forget to lock the cart to the cleaning station, thereby allowing for movement of the cart during transfer or receipt of the cart.

Further, instruments racks are generally heavy, regardless of whether the racks have been loaded with instruments. As such, even after an instrument rack is transferred from a transfer cart to a cleaning station, a weight of an instrument rack and a distribution of medical instruments within the instrument rack may cause the instrument rack to roll out of the cleaning station and onto the floor.

The present invention provides an improved system for transporting and transferring racks between transfer carts and processing or conveyor stations.

SUMMARY OF THE INVENTION

In accordance with an aspect of the present invention, there is provided a system for transporting a movable rack assembly and transferring the movable rack assembly between a transfer cart assembly and a station. The transfer cart assembly is configured to transport the movable rack assembly to the station, transfer the movable rack assembly to the station, and receive the movable rack assembly from the station. The system includes a rack support assembly, a rack locking assembly, a docking enabling assembly, a cart locking assembly, and an anti-return mechanism.

The rack support assembly is integrated into the transfer cart assembly. The rack support assembly is configured to securely and movably support the movable rack assembly thereon. The rack locking assembly is integrated into the transfer cart assembly. The rack locking assembly is configured to lock the movable rack assembly to the rack support assembly. The docking enabling assembly is integrated into the transfer cart assembly. The docking enabling assembly is configured to enable temporary docking of the transfer cart assembly with the station for the transfer of the movable rack assembly to the station or the receipt of the movable rack assembly from the station.

The cart locking assembly is integrated into the station. The cart locking assembly is configured to interact with the docking enabling assembly to temporarily secure the transfer cart assembly to the station for the transfer of the movable rack assembly to the station or the receipt of the movable rack assembly from the station. The anti-return mechanism is integrated into the station. The anti-return mechanism is configured to actively inhibit removal of the movable rack assembly from the station or transfer of the movable rack assembly to the station when the transfer cart assembly is not temporarily secured to the station.

When the transfer cart assembly is temporarily secured to the station, the anti-return mechanism is deactivated to allow for the transfer of the movable rack assembly from the transfer cart assembly to the station or the receipt of the movable rack assembly from the station by the transfer cart assembly. When the transfer cart assembly is temporarily secured to the station, the rack locking assembly is unlocked to allow for the transfer of the movable rack assembly to the station or the receipt of the movable rack assembly from the station.

In accordance with another aspect of the present invention, there is provided a transfer cart assembly for transporting, transferring, and receiving a movable rack assembly. The transfer cart assembly includes a rack support assembly and a rack locking assembly. The rack support assembly is configured to support the movable rack assembly for transport thereof and enable movement of the movable rack assembly for transfer or receipt thereof. The rack support assembly includes two side rails extending parallel to each other. The side rails have respective inner surfaces connected by front and rear lateral walls at corresponding ends of the side rails.

The rack locking assembly of the transfer cart assembly is configured to lock the movable rack assembly onto the rack support assembly. The rack locking assembly includes rack latches, a rack latch bar, a hook apparatus, and a push rod. The rack latches are respectively disposed facing each other on the inner surfaces of the side rails. The rack latches are configured to lock the movable rack assembly to the rack support assembly. The rack latch bar extends between the rack latches to control an orientation of the rack latches. The hook apparatus includes a hook that is structurally shaped to secure the rack latch bar therewithin.

The push rod extends through the front lateral wall and the hook apparatus and into the rear lateral wall within which a cart spring is applied to the push rod. The hook apparatus is fixed to the push rod. The push rod includes a push member connected thereto ahead of the front lateral wall. The push rod is configured to move the hook apparatus toward the rear lateral wall when pressure applied to the push member forces the push rod toward the rear lateral wall to compress the cart spring, thereby removing the hook of the hook apparatus from around the rack latch bar and allowing the rack latches to release the movable rack assembly in a locked state therefrom or receive the movable rack assembly in an unlocked state thereon.

An advantage of the present invention is the provision of a system in which all assemblies are mechanically compatible.

Another advantage of the present invention is the ability to securely dock a transfer cart assembly with a station through interaction of a docking enabling assembly integrated into the transfer cart assembly with a corresponding cart locking assembly integrated into the station.

Another advantage of the present invention is the ability to inhibit a movable rack assembly from undesirable movement within a station through the implementation of an anti-return mechanism within the station.

Another advantage of the present invention is the ability to deactivate the anti-return mechanism during the secure docking of the transfer cart assembly with the station, thereby allowing the movable cart assembly to be transferred from the transfer cart assembly to the station or received by the transfer cart assembly from the station.

Another advantage of the present invention is the ability to undock the transfer cart assembly from the station by pulling the transfer cart assembly away from the station, thereby simultaneously serving to reactivate the anti-return mechanism of the station.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

Figure 1:
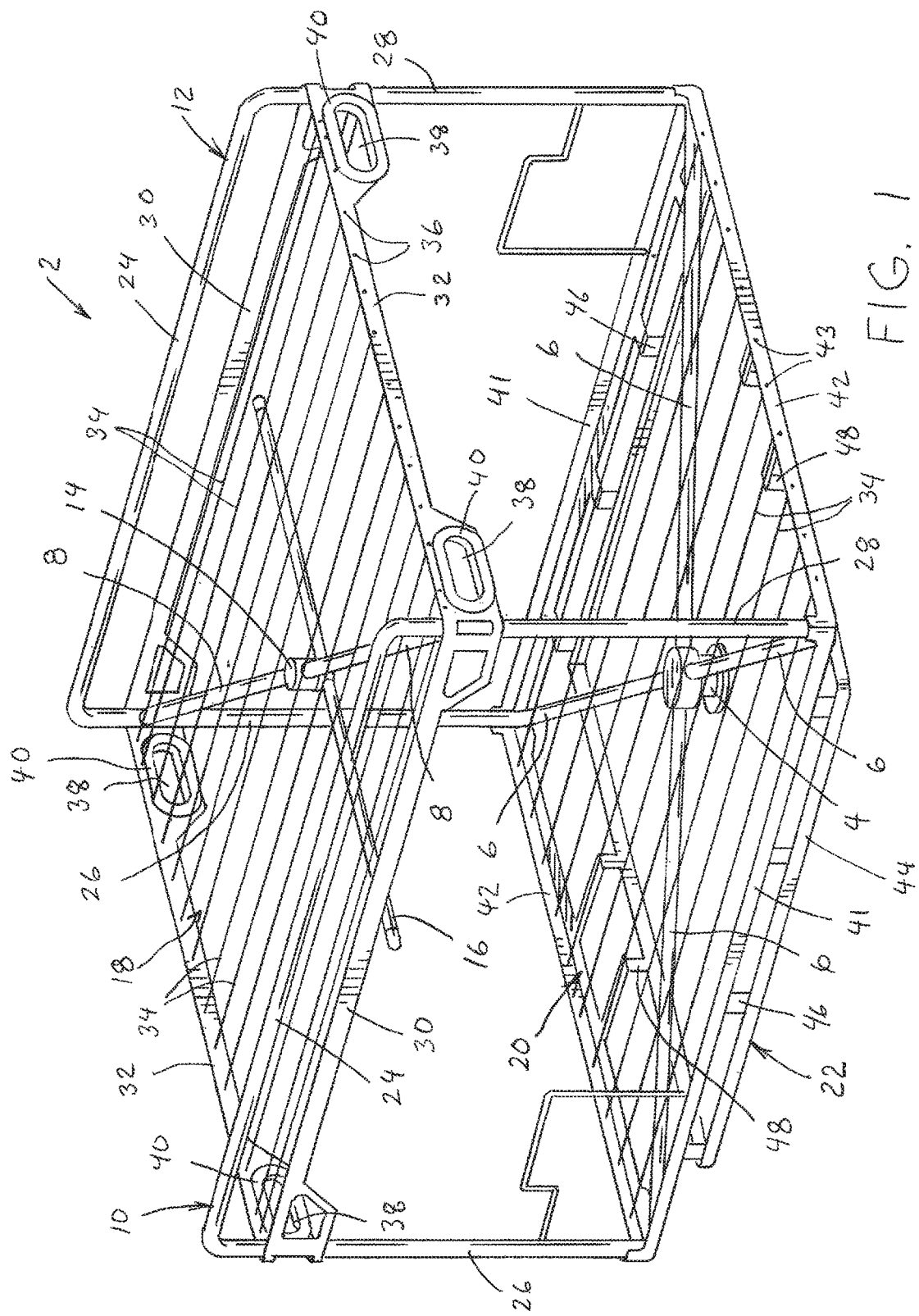
FIG. 1 is a perspective view illustrating a movable rack assembly.
Figure 2:
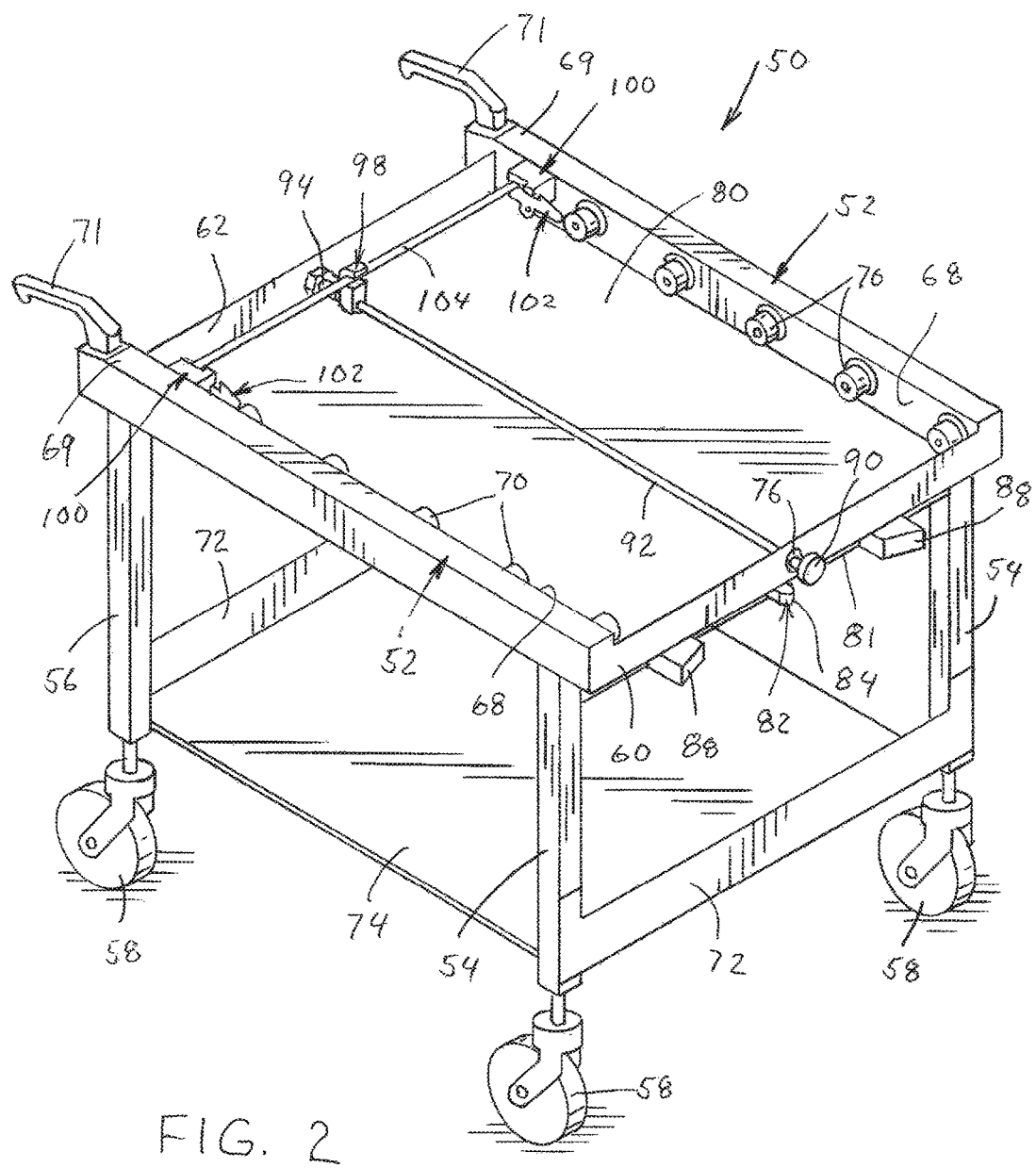
FIG. 2 is a perspective view illustrating a transfer cart assembly

Referring now to the drawings wherein the showings are for illustrating example embodiments of the invention only and not for limiting same, FIG. 1 illustrates a perspective view of movable rack assembly 2. While movable rack assembly 2 is configured herein for the support of medical instruments thereon, the support that can be provided by movable rack assembly 2 is not limited to medical instruments. Movable rack assembly 2 can be used to transport a variety of items thereon for a variety of applications.

Movable rack assembly 2 is generally rectangular, although it is not limited thereto. Movable rack assembly 2 is at least partially defined by central hub 4, a plurality of tubular base members 6, a plurality of tubular transverse members 8, two (2) U-shaped tubular frame members 10 and 12, spray arm mounting boss 14, rotatable spray arm assembly 16, upper shelf 18, lower shelf 20, and support assembly 22.

Central hub 4 of movable rack assembly 2 is mechanically configured to fluidly connect to and communicate with processing station 138. Processing station 138 is described herein as representing one of many apparatuses that include a fluid circulation system. Such fluid circulation systems include, but are not limited to, a washer and a disinfector. Processing station 138 is described in further detail below with respect to FIGS. 7-15 and 17.

With respect to movable rack assembly 2, each of tubular base members 6 extends from central hub 4 diagonally across movable rack assembly 2 to connect to one of U-shaped tubular frame members 10 and 12. Each of tubular base members 6 is connected to central hub 4 at one end of tubular base member 6, and mechanically configured to fluidly communicate therewith.

Each of tubular base members 6 also has an end opposite to the end connected to central hub 4 that is connected to one of U-shaped tubular frame members 10 and 12. Each of tubular base members 6 is also mechanically configured to fluidly communicate with one of U-shaped tubular frame members 10 and 12. Each of U-shaped tubular frame members 10 has opposite ends that are connected to one of tubular base members 6, and mechanically configured to fluidly communicate therewith.

U-shaped tubular frame members 10 and 12 are parallel in a particular plane and respectively define opposite sides of movable rack assembly 2. U-shaped tubular frame members 10 and 12 respectively include parallel horizontal portions 24 and parallel vertical leg portions 26 and 28.

Each of U-shaped tubular frame members 10 and 12 is connected to an end of one of tubular transverse members 8, and mechanically configured to fluidly communicate therewith. Each of U-shaped tubular frame members 10 and 12 is connected to an end of one of tubular transverse members 8 at an upper section of one of vertical leg portions 26 and 28. Tubular transverse members 8 extend from respective vertical leg portions 26 and 28 diagonally across movable rack assembly 2 to spray arm mounting boss 14. Each of vertical leg portions 26 and 28 extends vertically from one of tubular base members 6 to a corresponding end of respective horizontal portions 24.

Spray arm mounting boss 14 connects respective opposite ends of tubular transverse members 8 and is mechanically configured to fluidly communicate therewith. Spray arm mounting boss 14 is a tubular element having a closed upper end. Rotatable spray arm assembly 16 is rotatably mounted to spray arm mounting boss 14 and mechanically configured to fluidly communicate therewith. Rotatable spray arm assembly 16 is further configured to spray fluid communicated by spray arm mounting boss 14 therefrom.

Upper shelf 18 is generally rectangular, although it is not limited thereto. Upper shelf 18 is at least partially defined by parallel and oppositely positioned side shelf upper brackets 30, parallel and oppositely positioned end shelf lower brackets 32, and parallel shelf rods 34. Side shelf upper brackets 30 extend between end shelf upper brackets 32. Each of side shelf upper brackets 30 also extends between vertical leg portions 26 and 28 of one of U-shaped tubular frame members 10 and 12.

Each of end shelf upper brackets 32 is at least partially defined by a plurality of rod-shaped upper apertures 36, a plurality of elongated openings 38, and molded rubber inserts 40 respectively fitted within elongated openings 38. Upper apertures 36 formed in one of end shelf upper brackets 32 correspond with upper apertures 36 formed in the opposite end shelf upper bracket 32. Each of shelf rods 34 is positioned to extend between corresponding upper apertures 36 of respective end shelf upper brackets 32 such that instruments can be positioned thereon. Each of elongated openings 38 is dimensioned to enable an operator to grasp movable rack assembly 2. Inserts 40 respectively fitted within openings 38 enable the operator to grasp movable rack assembly 2 when movable rack assembly 2 is hot.

Lower shelf 20 is generally rectangular, although not limited thereto. Lower shelf 20 is at least partially defined by parallel and oppositely positioned side shelf brackets 41, parallel and oppositely positioned end shelf lower brackets 42, and parallel shelf rods 34, such as those used to at least partially define upper shelf 20. Side shelf lower brackets 41 extend between end shelf lower brackets 42. Each of side shelf lower brackets 41 also extends between vertical leg portions 26 and 28 of one of U-shaped tubular frame members 10 and 12.

Each of end shelf lower brackets 42 is at least partially defined by a plurality of rod-shaped lower apertures 43. Lower apertures 43 formed in one of end shelf lower brackets 42 correspond with lower apertures 43 formed in the opposite end shelf lower bracket 42. Each of shelf rods 34 is positioned to extend between corresponding lower apertures 43 of respective end shelf lower brackets 42 such that instruments can be positioned thereon.

Support assembly 22 is attached to lower shelf 20 and extends downward from lower shelf 20. Support assembly 22 is structurally configured to enable movable rack assembly 2 to be supported on transfer cart assembly 50, which will be discussed in detail below with respect to FIGS. 2-7 and 12-17. Support assembly 22 is generally rectangular, although not limited thereto. Support assembly 22 is at least partially defined by support frame 44, a plurality of side frame connectors 46, and a plurality of end frame connectors 48.

Side frame connectors 46 extend from side shelf lower brackets 41 of lower shelf 20. End frame connectors 48 extend from end shelf lower brackets 42 of lower shelf 20. Side frame connectors 46 and end frame connectors 48 initially and respectively extend from side shelf lower brackets 41 and end shelf lower brackets 42 toward a center of movable rack assembly 2 and then downwardly away from lower shelf 20 until reaching support frame 44. End frame connectors 48 may generally extend further from end shelf lower brackets 42 toward the center of movable rack assembly 2 than do side frame connectors 46 from side shelf lower brackets 41. An extension of side frame connectors 46 and end frame connectors 48 away from lower shelf 20 may be generally uniform.

FIGS. 2-7 and 12-17 illustrate various views and perspectives of transfer cart assembly 50. Transfer cart assembly 50 is generally configured to transport, transfer, and receive movable rack assembly 2. Transfer cart assembly 50 is at least partially defined by a rack support assembly, a rack locking assembly, and a docking enabling assembly. The rack support assembly, the rack locking assembly, and the docking enabling assembly are defined by various elements of transfer cart assembly 50 that are discussed below in further detail.

The rack support assembly is configured to support movable rack assembly 2 for transport thereof and enable movement of movable rack assembly 2 for transfer or receipt thereof. The rack assembly is at least partially defined by two spaced-apart side rails 52, a pair of front legs 54, a pair of rear legs 56, casters 58, front lateral wall 60, and rear lateral wall 62. Side rails 52 are parallel to each other. Each of side rails 52 is at least partially defined by inner surface 68. A plurality of spaced-apart rollers 70 is mounted on each of inner surfaces 68 to face each other. Rollers 70 are generally cylindrical in shape, and positioned such that respective uppermost portions of rollers 70 always define a continuous plane below a top portion of side rails 52. When movable rack assembly 2 is not locked by the rack locking assembly, which is further described below, rollers 70 enable movement of movable rack assembly 2 on the rack support assembly for the transferring of movable rack assembly 2 therefrom or the receiving of movable rack assembly 2 thereon.

Inner surfaces 68 and the continuous plane defined by the respective uppermost portions of rollers 70 at least partially define a transfer path by which movable rack assembly 2 may be transferred onto and off transfer cart assembly 50. Rollers 70 are disposed and dimensioned such that upper portions of inner surfaces 68 of side rails 52 extend above the transfer path and the continuous plane defined by the uppermost portions of rollers 70. Respective inner surfaces 68 of side rails 52 define the side boundaries of the transfer path.

Each of side rails 52 is also at least partially defined by handle 71, which is positioned at a rear area of side rail 52 on top surface 69 thereof. Handles 71 extend away from a center of transfer cart assembly 50. Further, each of side rails 52 is supported by an end of one of front legs 54 and an end of a corresponding rear leg 56. Caster 58 is inserted into an opposite end of each of legs 54 and 56. Lower tray 74 is oriented between opposing sides of front legs 54, opposing sides of rear legs 56, and leg support plates 72. One of leg support plates 72 extends between front legs 54 and is attached thereto to secure front legs 54 to each other. Another one of leg support plates 72 extends between rear legs 56 and is attached thereto for securing rear legs 56 to each other.

Front lateral wall 60 extends between inner surfaces 68 of side rails 52 at a front area of side rails 52. Front aperture 76 is formed in a center portion of front lateral wall 60. Rear lateral wall 62 extends between inner surfaces 68 of side rails 52 at a rear area of side rails 52. Rear aperture 78 is formed in a center portion of rear lateral wall 62. In one example, rear aperture 78 is larger than front aperture 76.

While bottom surfaces of side rails 52, front lateral wall 60, and rear lateral wall 62 may correspond with or be parallel to each other, in one example, side rails 52 have a greater height than front lateral wall 60 and rear lateral wall 62. Upper tray 80 is positioned adjacent to the bottom surfaces of side rails 52, front lateral wall 60, and rear lateral wall 62.

Figure 3:
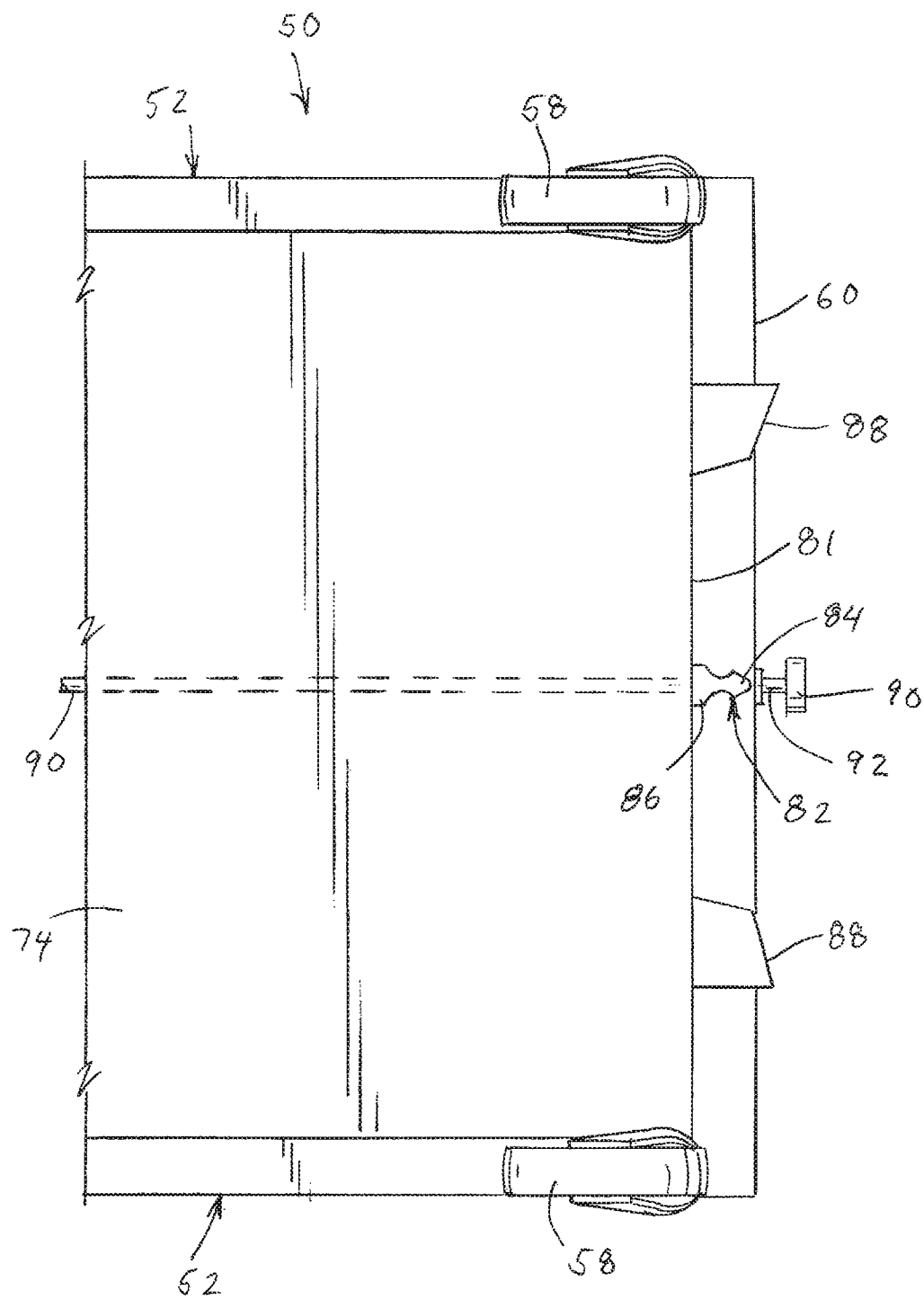
FIG. 3 is a partial plan view illustrating a bottom front of the transfer cart assembly illustrated in FIG. 2.
Figure 4:
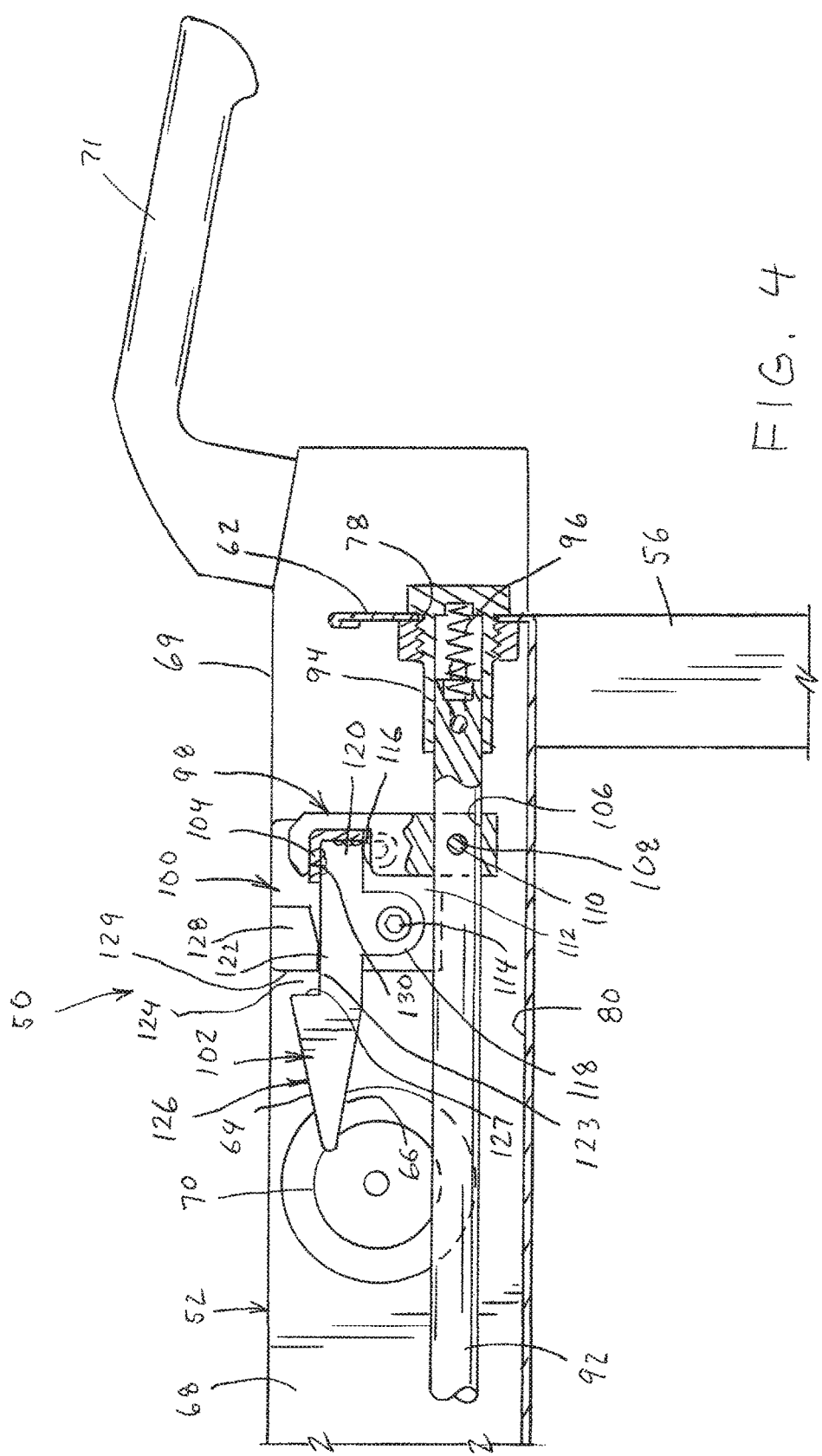
FIG. 4 is a partial plan view illustrating a rear top side of the transfer cart assembly illustrated in FIG. 2.
Figure 5:
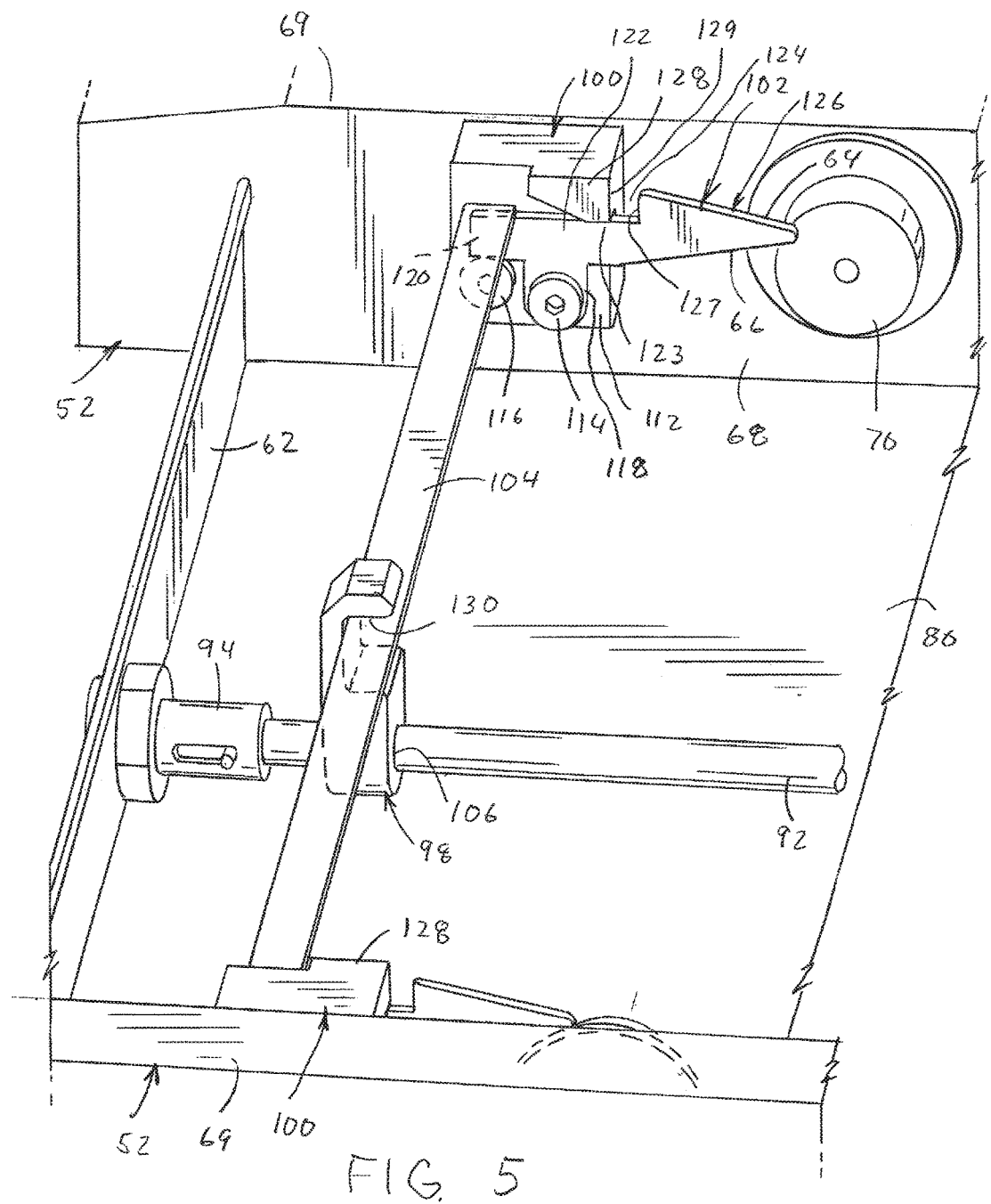
FIG. 5 is a partial perspective view illustrating a rear top side of the transfer cart assembly illustrated in FIG. 2.
Figure 6:
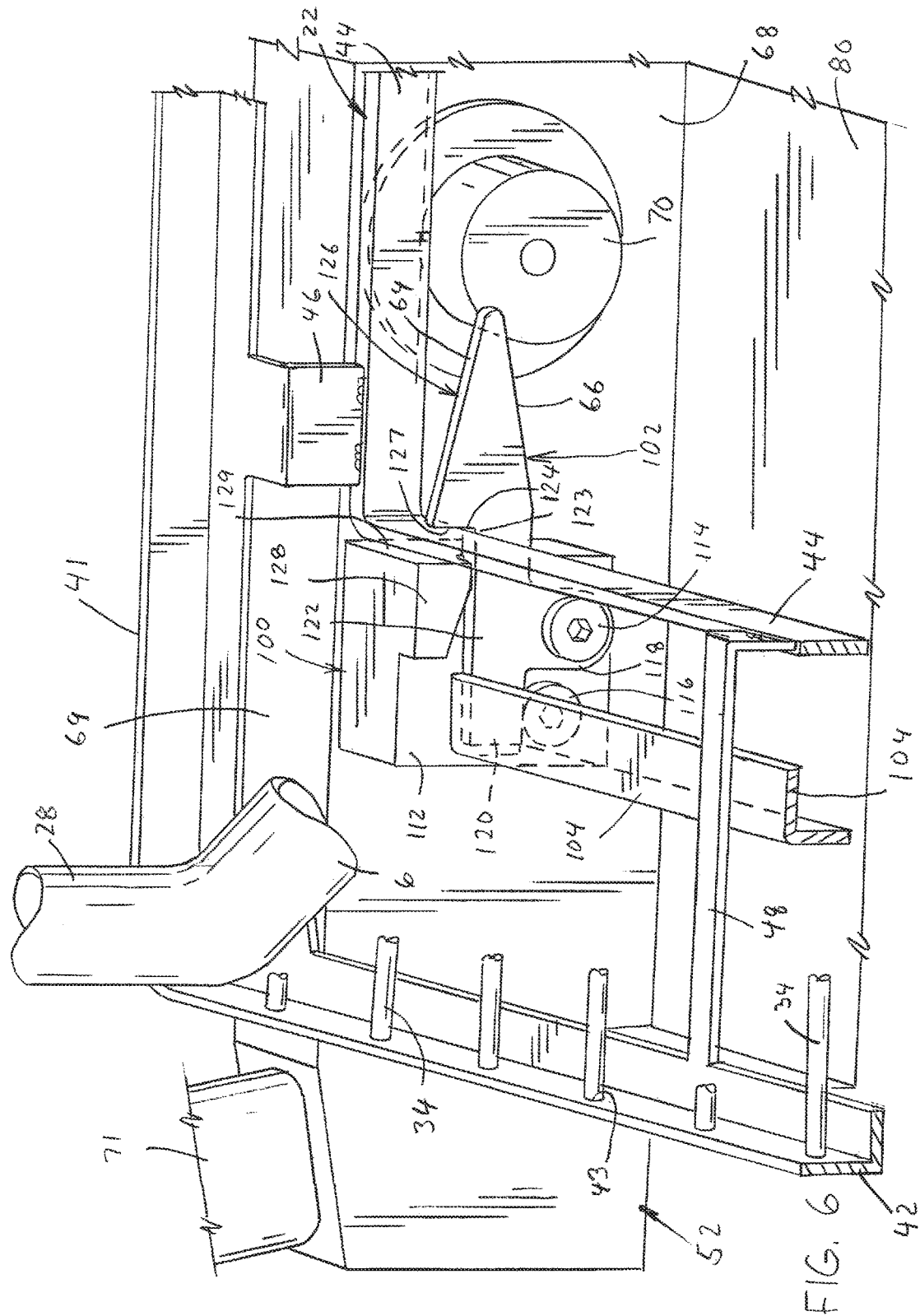
FIG. 6 is a magnified, partial perspective view illustrating a rear top side of the transfer cart assembly illustrated in FIG. 5 when the movable rack assembly illustrated in FIG. 1 is disposed thereon.

The docking enabling assembly, generally best viewed in FIGS. 2, 3, and 12-15, is configured to enable movable rack assembly 2 to be transferred from or received onto the rack support assembly. The docking enabling assembly is at least partially defined by docking plate 81 and cart latch fixture 82. Docking plate 81 is disposed between an upper area of front legs 54 and below upper tray 80. As such, docking plate 81 is positioned slightly to the rear of front lateral wall 60, as is illustrated in FIG. 3.

Cart latch fixture 82 is disposed at a center of docking plate 81. Cart latch fixture 82 extends away from plate 81 and a center of transfer cart assembly 50, but does not extend past front lateral wall 60. Cart latch fixture 82 is at least partially defined by head portion 84 and body portion 86. Cart latch fixture is contoured to fit securely within locking mechanism 148 of cart locking assembly 142 that is integrated into end 140 of processing station 138.

The docking enabling assembly may be additionally defined by a plurality of docking pads 88. Each of docking pads 88 is shaped to contact slanted surface 145 of housing 146 of locking mechanism 148 when cart latch fixture 82 is secured within locking mechanism 148.

The rack locking assembly is configured to lock movable rack assembly 2 to the rack support assembly of transfer cart assembly 50. The rack locking assembly is at least partially defined by push member 90, push rod 92 connected to push member 90, cart spring housing 94 positioned within rear aperture 78, cart spring 96 positioned inside cart spring housing 94 within rear aperture 78 of rear lateral wall 62, hook apparatus 98 positioned on push rod 92, a pair of mounting blocks 100 mounted on respective inner surfaces 68 of side rails 52, a pair of rack latches 102 rotatably attached to respective inner surfaces 68 of side rails 52 by being respectively mounted on mounting blocks 100, and a rack latch bar 104 extending between rack latches 102.

Push rod 92 is connected to push member 90 ahead of front lateral wall 60. As such, an end of push rod 92 is disposed ahead of front lateral wall 60 on an opposite side thereof from the rack support assembly. Push rod 92 extends from push member 90 through front aperture 76 in front lateral wall 60, then from front lateral wall 60 to rear lateral wall 62, and then into cart spring housing 94 within rear lateral wall 62 to make contact with cart spring 96. Push rod 92 also extends through hook apparatus 98 between front lateral wall 60 and rear lateral wall 62. Cart spring 96 expands toward front lateral wall 60 such that push rod 92 is biased to extend away from rear lateral wall 62 and toward front lateral wall 60. The biasing of push rod 92 positions push member 90 such that it is normally spaced-apart from front lateral wall 60. Pressure can be applied onto push member 90, which forces push member 90 toward front lateral wall 60 and moves push rod 92 toward rear lateral wall 62, thereby resulting in compression of cart spring 96 by push rod 92.

Hook aperture 106 is formed within hook apparatus 98 and allows push rod 92 to extend therethrough. Pin 110 extends through a pair of corresponding holes 108 in push rod 92 and hook apparatus 98, thereby securing hook apparatus 98 to push rod 92. As a result, hook apparatus 98 moves with push rod 92. Further, hook apparatus 98 is at least partially defined by forward-facing hook 130 that is structurally shaped to removably secure rack latch bar 104 therewithin and inhibit movement of rack latch bar 104.

When push rod 92 is forced toward rear lateral wall 92 by pressure applied to push member 90, hook apparatus 98 moves with push rod 92, thereby resulting in the disengagement of hook 130 from securing rack latch bar 104, thereby enabling rack latch bar 104 and rack latches 102 to move. When push rod 92 is not being pressured forced toward rear lateral wall 92 by pressure applied to push member 90, hook apparatus 98 is positioned such that rack latch bar 104 is secured within hook 130. As push rod 92 is normally not being forced toward rear lateral wall 92, hook 130 is normally positioned to secure rack latch bar 104 therewithin.

Mounting blocks 100 are correspondingly disposed on inner surfaces 68 of side rails 52 at a location between rear lateral wall 62 and rearmost rollers 70. Mounting blocks 100 are at least partially defined by respective surfaces of mounting blocks 100 identified herein as block projections 128. Block projections 128 are positioned to be inclined toward both a center of transfer cart assembly 50 and front lateral wall 60.

Rack latches 102 are configured to lock movable rack assembly 2 to the rack support assembly of transfer cart assembly 50. Each of rack latches 102 is at least partially defined by latch mounting section 118, latch bar section 120, latch base section 122, latch notch section 124, and latch taper section 126. Latch bar section 120 is the closest section of rack latch 102 to rear lateral wall 62. Rack latch bar 104 is connected to latch bar section 120 of rack latch 102 and dimensioned to be secured within hook 130. Rack latch bar 104 extends across transfer cart assembly 50 between latch bar sections 120 of respective rack latches 102 to control an orientation of rack latches 120.

Latch base sections 122 are generally disposed adjacent to latch mounting sections 118 and latch bar sections 120. Latch base sections 122 are located between latch bar sections 120 and latch notch sections 124. Latch notch sections 124 are located between latch base sections 122 and latch taper sections 126.

Each of latch taper sections 126 is at least partially defined by rear edge 127, upper taper portion 64, and lower taper portion 66. Latch taper sections 126 are the closest sections of rack latches 102 to front lateral wall 60.

Rack latches 102 are mounted on respective mounting blocks 100 such that block projections 128 are positioned directly above respective latch base sections 122 to partially define respective latch notch sections 124. Since block projections 128 are inclined toward the center of cart assembly 50, latch base sections 122 are respectively inhibited from rotating above block projections 128.

Further, a plurality of holes (not shown) is formed in inner surface 112 of each of mounting blocks 110. One of the holes formed in each of mounting blocks 110 accepts latch mounting bolt 114. Latch mounting bolts 114 extend through mounting sections 118 of respective rack latches 102 and into corresponding holes formed in respective mounting blocks 100. Each of rack latches 102 is rotatably secured to mounting block 100 by latch mounting bolt 114.

Another one of the holes formed in each of mounting blocks 110 accepts latch bar stop 116 for directly supporting latch bar section 120 thereon. Each of latch bar stops 116 is disposed on one of mounting blocks 110 to inhibit downward movement of latch bar section 120 and rack latch bar 104. Latch bar stops 116 may also serve to secure respective mounting blocks 100 to side rails 52.

Each of latch notch sections 124 is at least partially defined by forward area 123 of latch base section 122, forward edge 129 of block projection 128 of mounting block 100, and rear edge 127 of latch taper section 126, which is disposed on an opposite site of latch notch section 124 from block projection 128 of mounting block 100. Rear edges 127 have generally vertical orientations extending upward from forward areas 123 of respective latch base sections 122. Upper taper portions 64 of respective latch taper sections 126 slope from a peak of rear edges 127 of respective latch taper sections 126 toward front lateral wall 60 until meeting lower taper portions 66. Lower taper portions 66 are partially tapered toward mounting sections 118 of respective rack latches 102. Latch notch sections 124 are respectively recessed from forwards edges 129 of block projections 128 of mounting blocks 100 and rear edges 127 of latch taper sections 126

Each of latch notch sections 124 is dimensioned to accept a portion of support frame 44 of movable rack assembly 2. Latch notch sections 124 are configured to inhibit lateral, forward, and rearward movement of movable rack assembly 2 when support frame 44 of movable rack assembly 2 is positioned within latch notch sections 124 of the rack locking assembly of transfer cart assembly 50 and rack latch bar 104 is secured within hook 130.

The weight of rack latch bar 104 is such that latch bar sections 120 are forced to rest on respective latch bar stops 116. Even when rack latch bar 104 is not secured within hook 130 and support frame 44 is positioned within latch notch sections 124, the weight of rack latch bar 104 biases latch bar sections 120 to rest on respective latch bar stops 116.

However, when rack latch bar 104 is not secured within hook 130 and support frame 44 is positioned within latch notch sections 124, rack latch bar 104 and latch bar sections 120 can be forced away from upper tray 80, and latch taper sections 126 can be forced toward upper tray 80. This allows rack latches 102 to release movable rack assembly 2 from a locked state within latch notch sections 124 and receive moveable rack assembly 2 in an unlocked state on latch taper sections 126. This will be described in further detail below.

As previously noted, FIGS. 7-15 and 17 illustrate processing station 138. Processing station 138 is at least partially defined by end 140, into which cart locking assembly 142 and anti-return mechanism 144 are integrated. Cart locking assembly 142 is secured to front surface 136 of end 140. Anti-return mechanism 144 is substantially positioned within end 140 of processing station 138.

Cart locking assembly 142 is at least partially defined by locking assembly housing 146 and locking mechanism 148. Locking assembly housing 146 is secured to end 140 of processing station 138 by housing bolts 147. Locking mechanism 148 is secured to end 140 of processing station 138 by mechanism bolts 149. Locking mechanism 148 is positioned within locking assembly housing 146 and accessible through housing aperture 192 formed in the center of housing 146.

Locking mechanism 148 is mounted on assembly mechanism mount 194 that is in turn mounted to front surface 136 of end 140 by mechanism bolts 149 extending through front surface 136 of end 140. Locking mechanism 148 is at least partially defined by rotating disks 150, rotating jaws 190, disk pins 182, jaw pins 188, locking arms 152 respectively attached to rotating jaws 190, locking spring housings 154, and locking springs 156 respectively positioned within locking spring housings 154.

Two pairs of rotating jaws 190 laterally and concavely oppose each other. One of rotating disks 150 is positioned between each of the pairs of rotating jaws 190 at one end thereof. Each of rotating disks 150 is secured to a corresponding pair of rotating jaws 190 by one of disk pins 182, which extends through each of rotating disks 150 and the corresponding pair of rotating jaws 190. Each of rotating disks 150 is configured to rotate around one of disk pins 182. One end of each of locking arms 152 is positioned between a center of one of the pairs of rotating jaws 190 and attached thereto. Each of the pairs of rotating jaws 190 is configured to rotate around one of jaw pins 188. Each of jaw pins 188 is positioned at an opposite end of one of the pairs of rotating jaws 190 from the end at which a corresponding one of rotating disks 150 is positioned. Each of jaw pins 188 extend through one side of assembly mechanism mount 194, then through one of the pairs of rotating jaws 190, and then out of another side of assembly mechanism mount 194.

Each of locking springs 156 is in contact with one of locking arms 152 at an opposite end thereof from a corresponding one of the pairs of rotating jaws 190. Each of locking spring housings 154 is at least partially defined by a slit formed therein that allows one of locking arms 152 to compress the corresponding locking spring 156.

Anti-return mechanism 144 is substantially positioned within and integrated into end 140 of processing station 138 and between front surface 136 and rear surface 134 of end 140. Anti-return mechanism 144 is at least partially defined by anti-return case 160, anti-return rod 158, anti-return bolts 162, anti-return nuts 164, anti-return springs 166, anti-return pins 176, pin springs 178, and pin mounts 180.

Anti-return case 160 is substantially positioned between front surface 136 and rear surface 134 of end 140. Anti-return rod 158 is fixed to and extends through a front of anti-return case 160. Anti-return rod 158 further extends from anti-return case 160 through front surface 136 of end 140. Anti-return rod 158 continues to extend through assembly mechanism mount 194 and into an area between the pairs of rotating jaws 190. Anti-return bolts 162 extend from a position within locking assembly housing 146 through front surface 136 of end 140 and into opposite sides of the front of anti-return case 160. Anti-return bolts 162 further extend through anti-return case 160 from front to back and through rear surface 134 of end 140. Anti-return nuts 164 are respectively threaded on the portions of anti-return bolts 162 that extend through rear surface 134 of end 140.

Each of anti-return pins 176 is mounted via pin mount 180 to have an end that extends through upper surface 184 of end 140. Each of anti-return pins 176 further has pin head 177 positioned on an opposite end thereof. Pin head 177 is positioned to contact a top surface of anti-return case 160, which has anti-return upper edge 170, anti-return tapered surface 172, and anti-return lower surface 174. Pin spring 178 is positioned on each of anti-return pins 176 between pin mount 180 and pin head 177.

Figure 7:
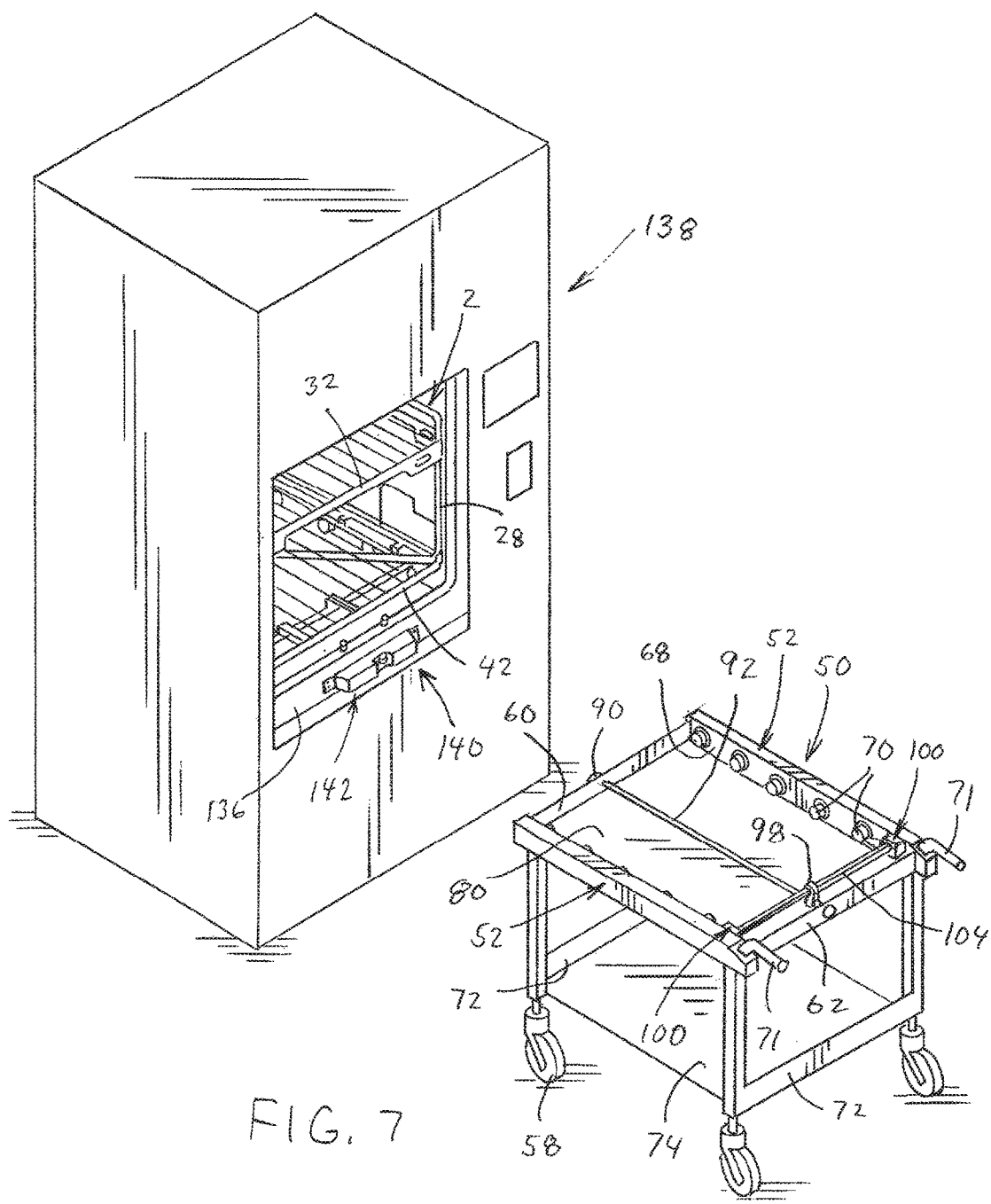
FIG. 7 is a perspective view illustrating the transfer cart assembly illustrated in FIG. 2 and the movable rack assembly illustrated in FIG. 1, when the movable rack assembly illustrated in FIG. 1 is disposed within a processing station and docking between the transfer cart assembly and the processing station is to occur or has occurred.
Figure 8:
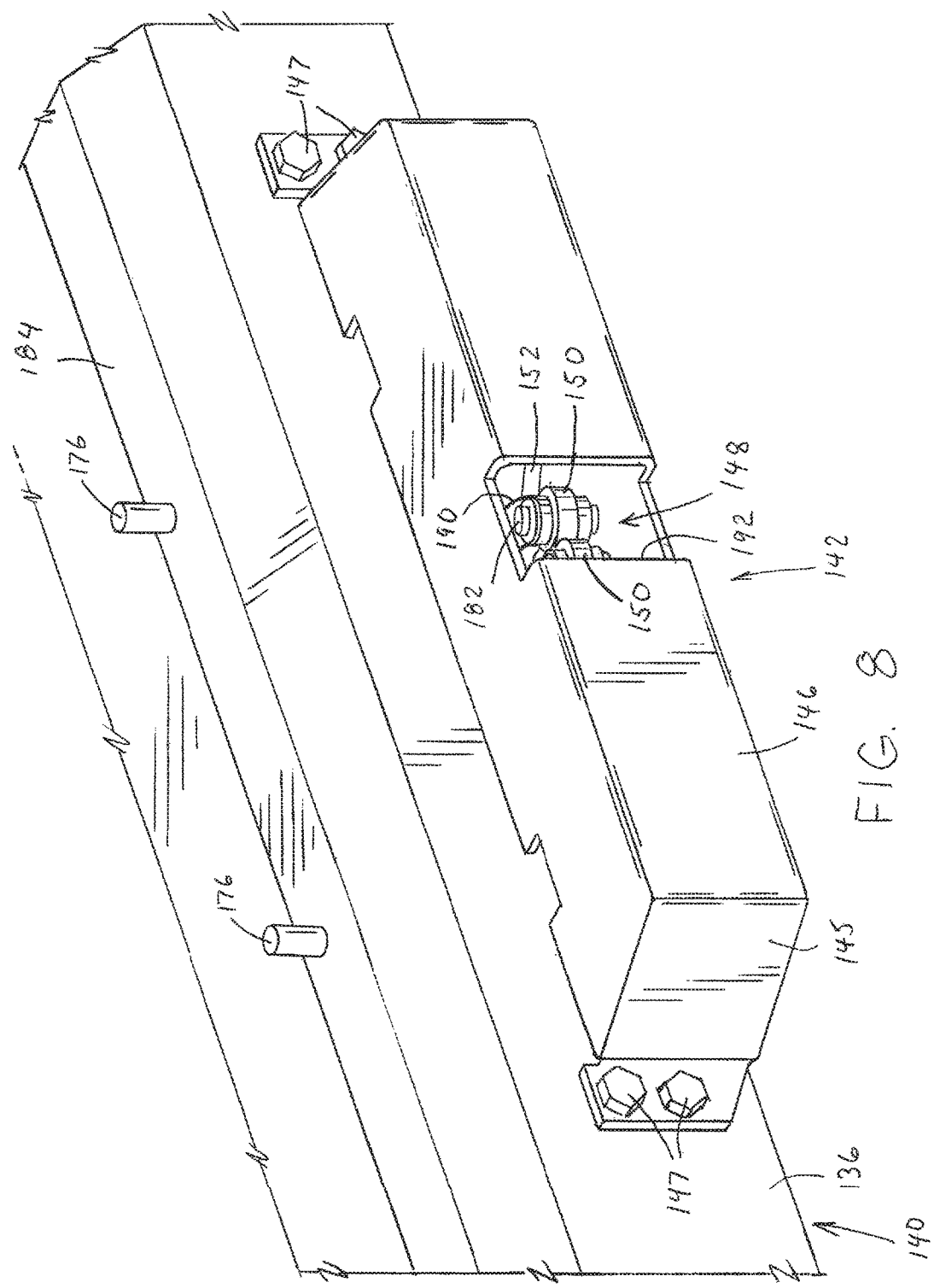
FIG. 8 is a perspective view illustrating a cart locking assembly at an end of the processing station illustrated in FIG. 7.
Figure 9:
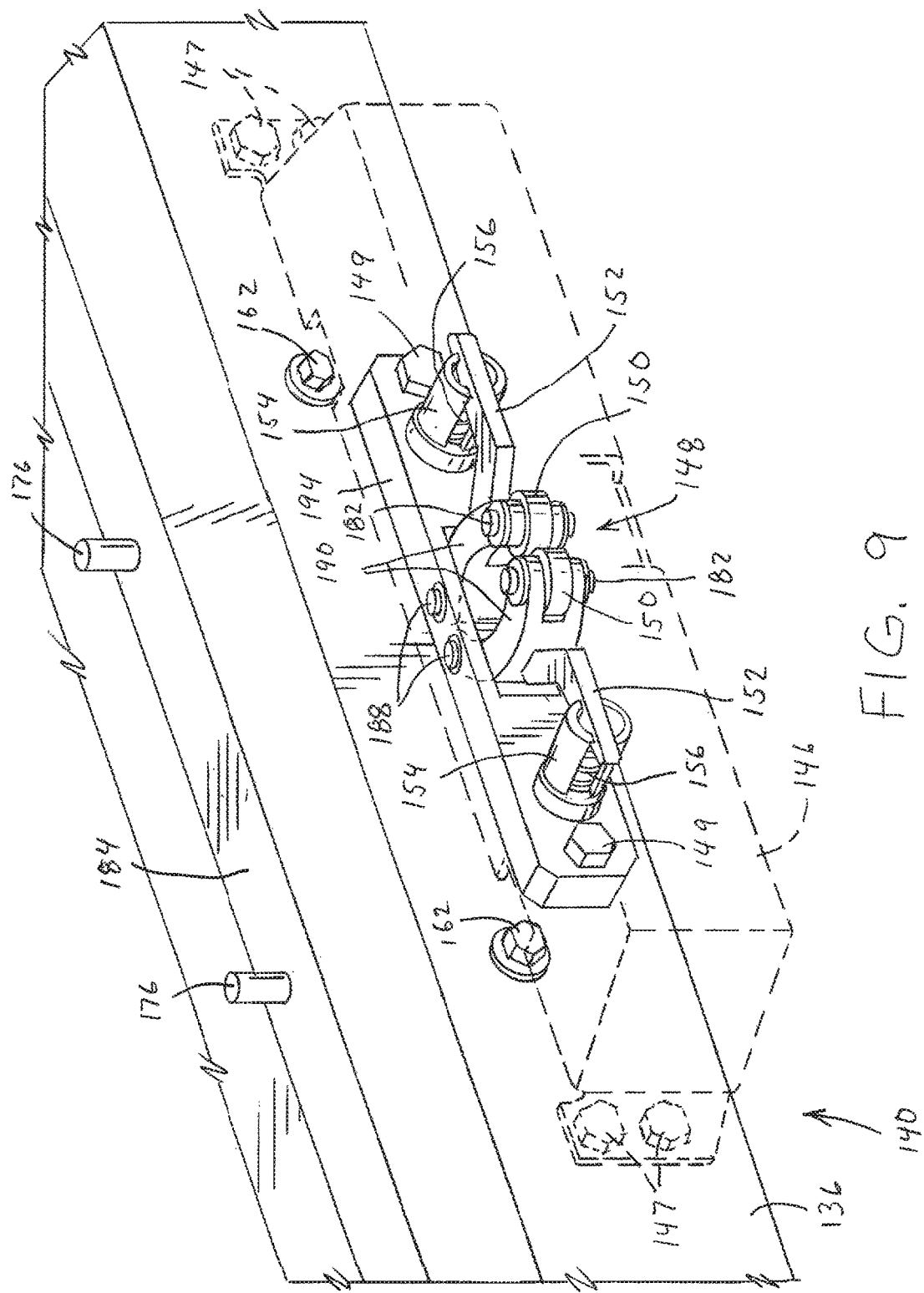
FIG. 9 is a perspective view illustrating a locking mechanism of the cart locking assembly illustrated in FIG. 8 that is disposed within a locking assembly housing thereof.
Figure 10:
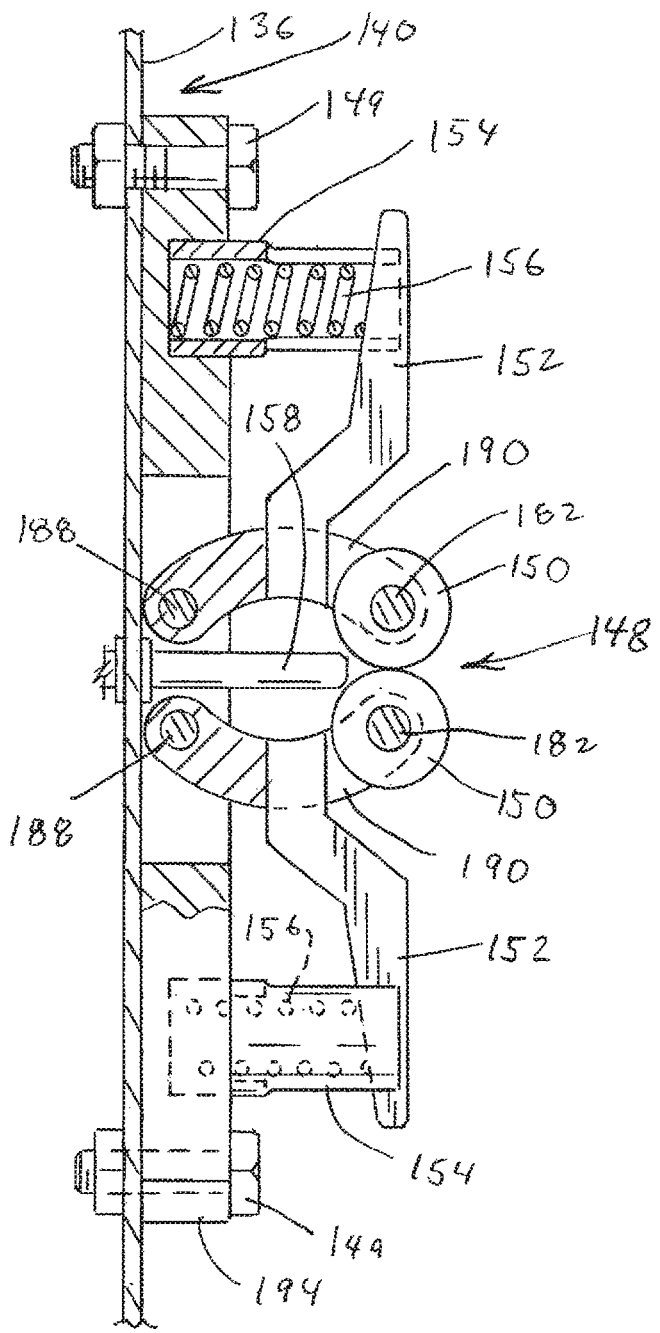
FIG. 10 is a top plan view illustrating the locking mechanism illustrated in FIG. 9.
Figure 11:
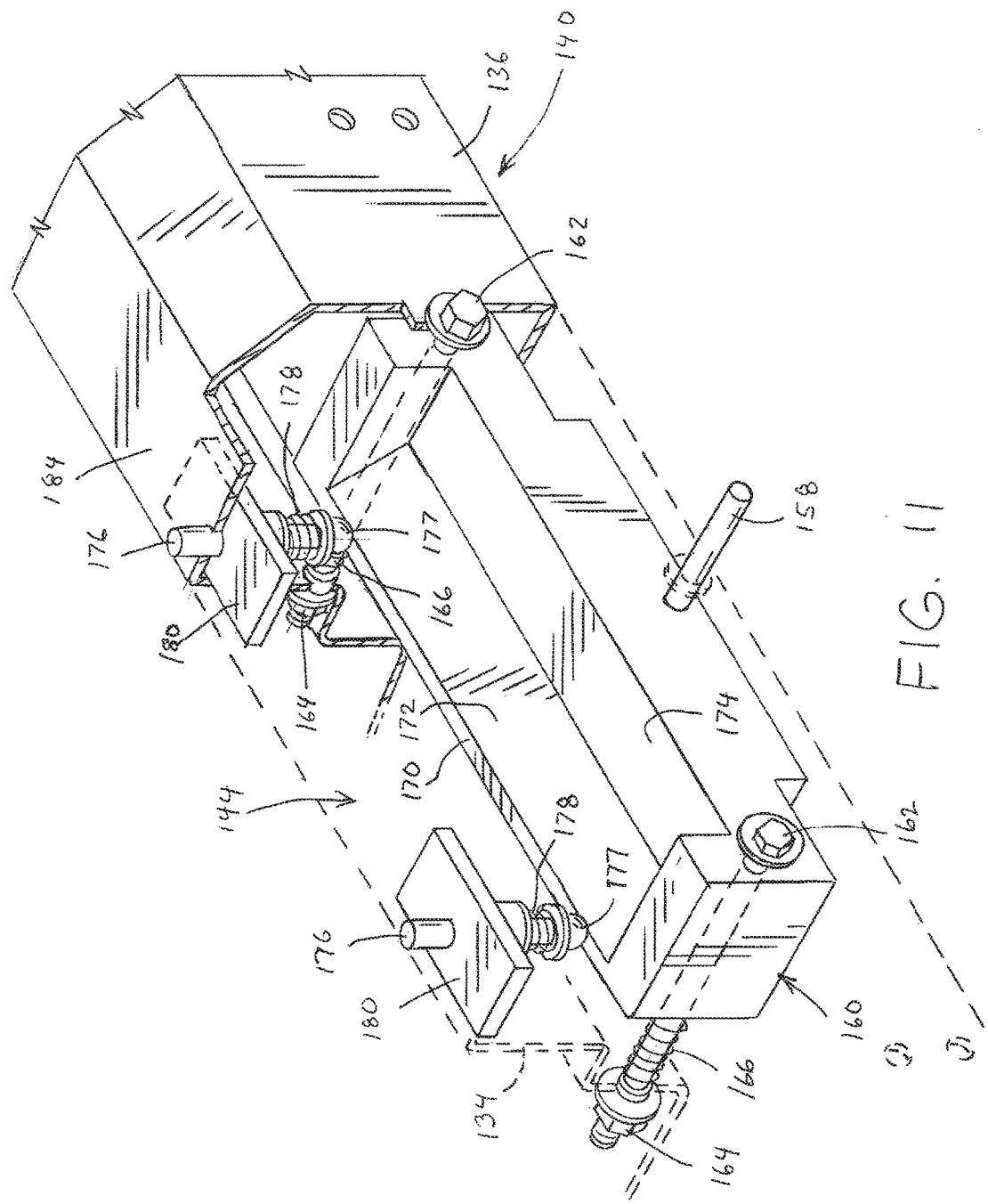
FIG. 11 is a perspective view illustrating an anti-return mechanism in the processing station illustrated in FIG. 7.

With respect to the interaction between transfer cart assembly 50 and processing station 138, FIG. 7 is a perspective view illustrating transfer cart assembly 50, movable rack assembly 2, and processing station 138, when movable rack assembly 2 is disposed within processing station 138 and docking between transfer cart assembly 50 and processing station 138 is to occur or has occurred.

Figure 12:
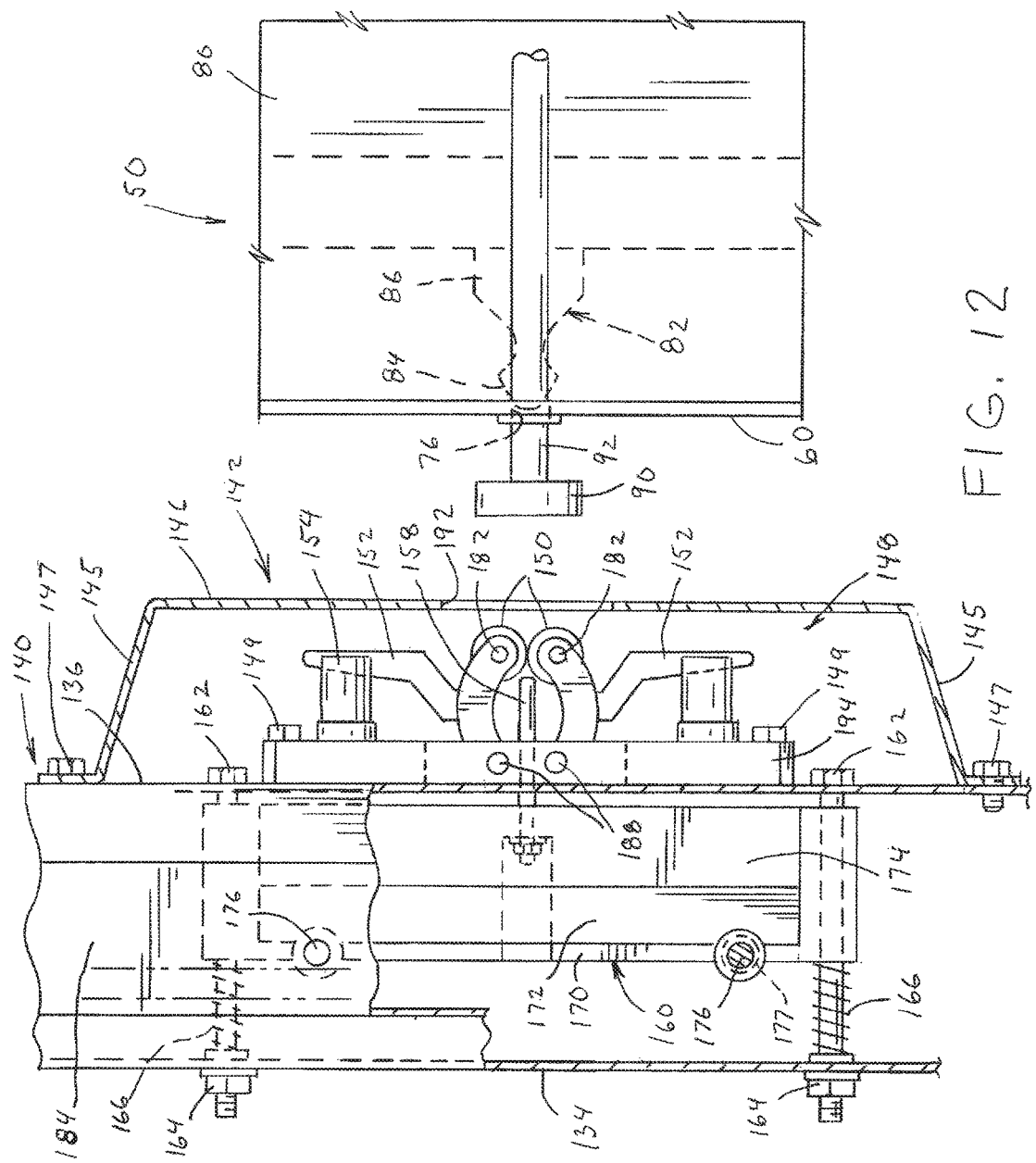
FIG. 12 is a top view illustrating an orientation between corresponding components of the transfer cart assembly illustrated in FIG. 2 and the processing station illustrated in FIG. 7, when docking between the transfer cart assembly and the processing station is to occur or has occurred.
Figure 13:
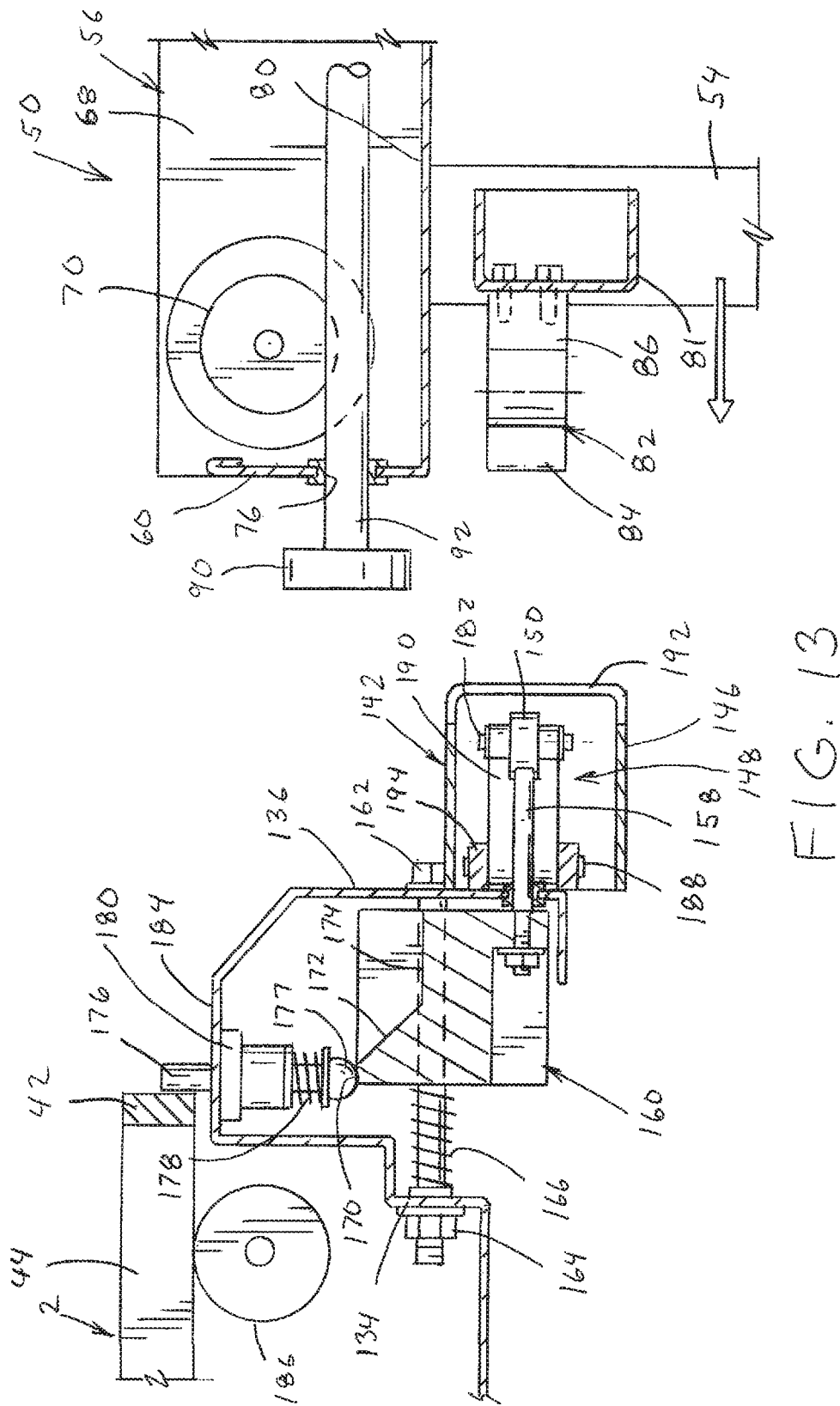
FIG. 13 is a side view illustrating the orientation illustrated in FIG. 12.
Figure 14:
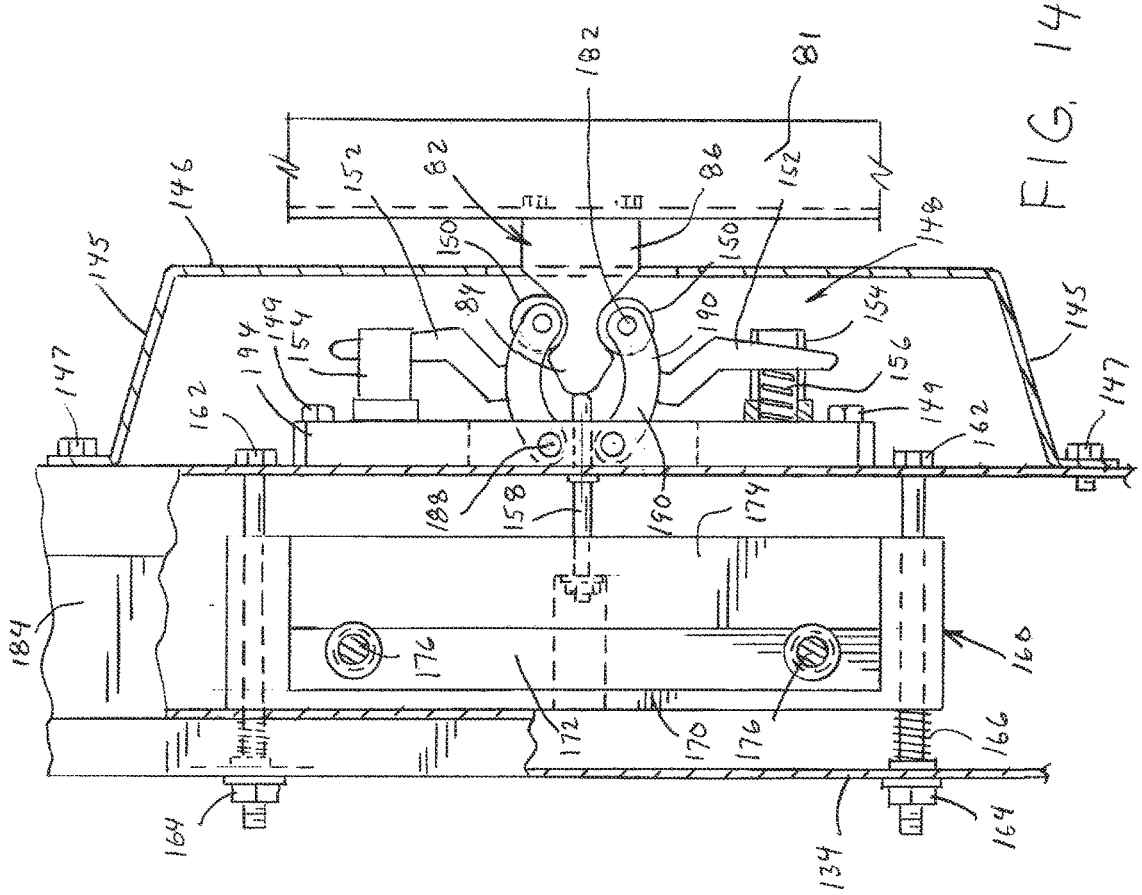
FIG. 14 is a top view illustrating an orientation between corresponding components of the transfer cart assembly illustrated in FIG. 2 and the processing station illustrated in FIG. 7 during docking between the transfer cart assembly and the processing station.
Figure 15:
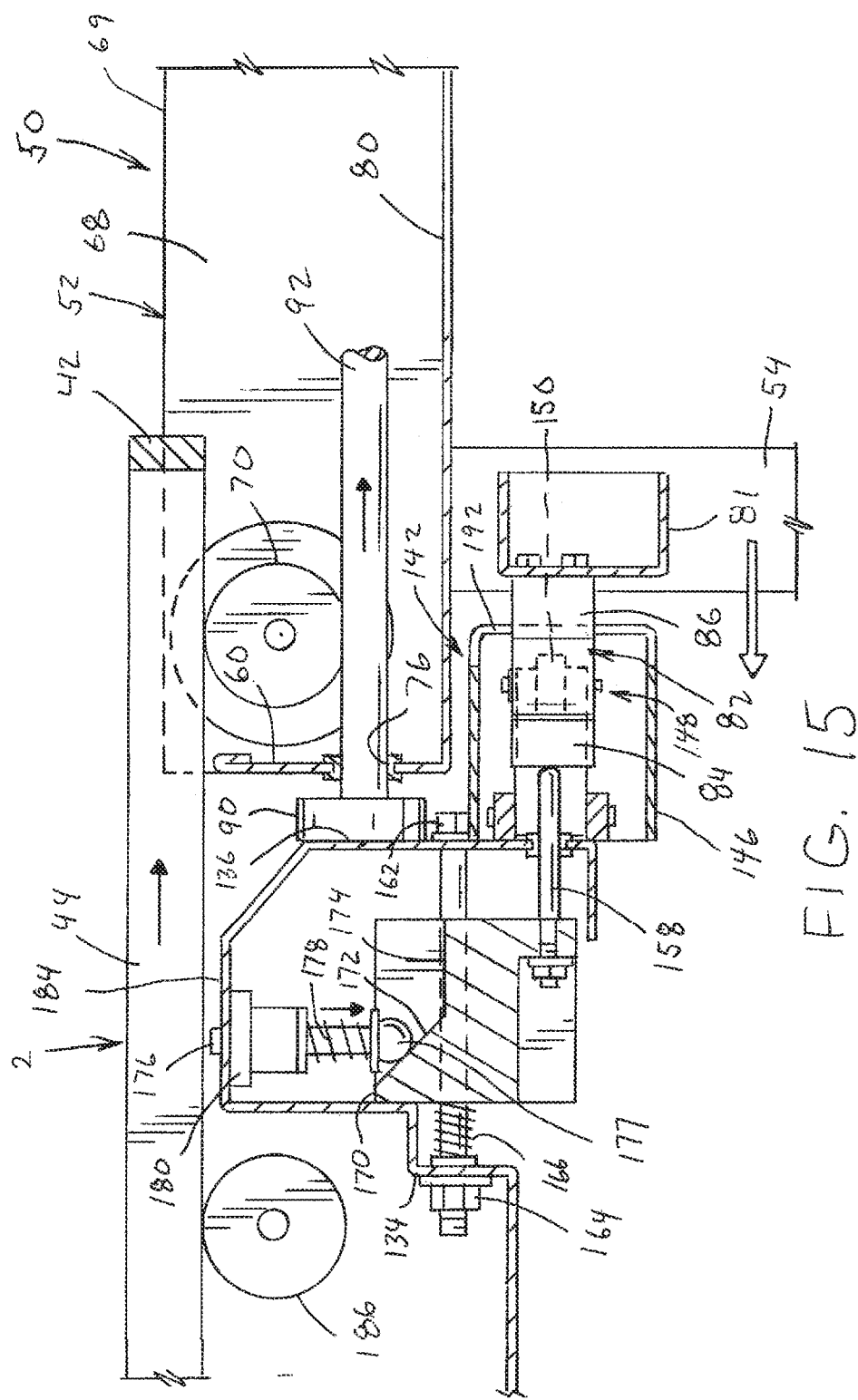
FIG. 15 is a side view illustrating the orientation illustrated in FIG. 14.
Figure 17:
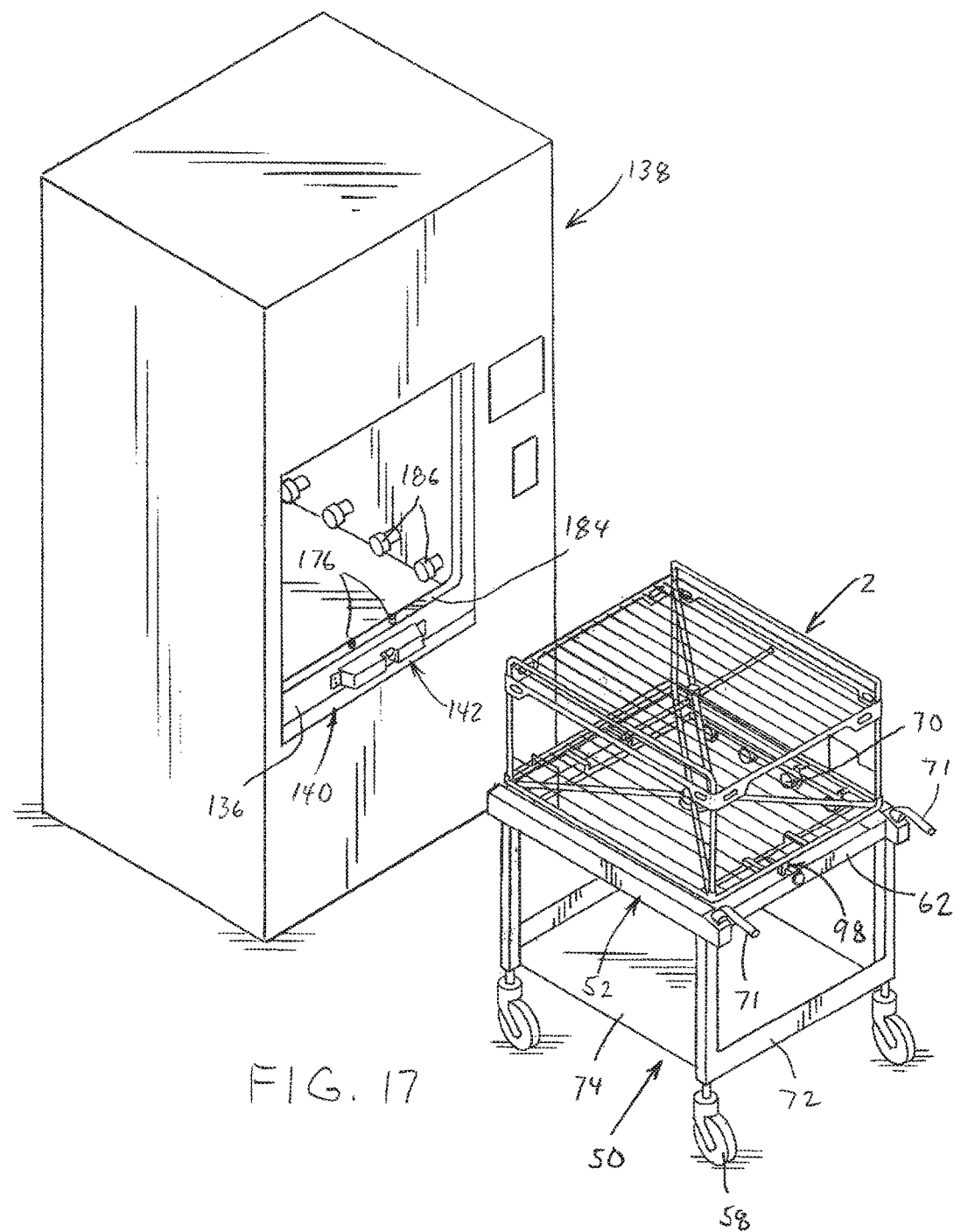
FIG. 17 is a perspective view illustrating the transfer cart assembly, the movable rack assembly, and the processing station illustrated in FIG. 7, when the movable rack assembly is disposed on the transfer cart assembly and docking between the transfer cart assembly and the processing station is to occur or has occurred.

Further, FIGS. 12 and 13 are respectively top and side views illustrating an orientation between corresponding components of transfer cart assembly 50 and processing station 138 when docking between transfer cart assembly 50 and processing station 138 is to occur or has occurred. FIGS. 14 and 15 are respectively top and side views illustrating an orientation between corresponding components of the transfer cart assembly 50 and processing station 138 during docking between the transfer cart assembly and the processing station Moreover, FIG. 17 is a perspective view illustrating transfer cart assembly 50, movable rack assembly 2, and processing station 138, when movable rack assembly 2 is disposed on transfer cart assembly 50 and docking between transfer cart assembly 50 and processing station 138 is to occur or has occurred.

As an initial example, movable rack assembly 2 is assumed to be loaded in processing station 138. As transfer cart assembly 50 is progressively pushed toward processing station 138, push member 90 of transfer cart assembly 50 contacts front surface 136 of end 140 and is forced toward front lateral wall 60. As a result, push rod 92 is forced to move toward rear lateral wall 62, thereby serving to compress cart spring 96. Rearward movement of push rod 92 because of force being applied thereto also serves to rearwardly move hook 130 toward rear lateral wall 62. Hook 130 is removed from around rack latch bar 104 and, therefore, no longer secures rack latch bar 104 therewithin. As such, rack latch bar 104 is released by hook 130 and allowed to freely move according to the rotation of latch bar sections 120 by rack latches 102. Since rack latch bar 104 is heavy, latch bar sections 120 of rack latch 102 continue to rest on respective latch bar stops 116 unless force is applied to latch taper sections 126 of rack latch 102.

The progressive push of cart assembly 50 toward processing station 138 also serves to push cart latch fixture 82 through housing aperture 192 and into contact with rotating disks 150 of locking mechanism 148. Rotating disks 150 are subsequently forced by head portion 84 of cart latch fixture 82 to rotate around respective disk pins 182 as pressure is placed on rotating disks 150 by the contour of head portion 84. Further, since rotating disks 150 are attached to ends of respective pairs of rotating jaws 190, the force applied to rotating disks 150 causes the pairs of rotating jaws 190 to rotate away from each other on respective jaw pins 188. The forced rotation of the pairs of rotating jaws 190 serves to force respective locking arms 152 to compress locking springs 156.

As cart latch fixture 82 is further pushed inward, rotating disks 150 continue rotating until eventually clearing head portion 84 and rolling onto body portion 86 of cart latch fixture 82. Body portion 86 is narrower than head portion 84, thereby reducing the force applied to rotating disks 150. As a result, locking springs 156 are able to expand, and locking arms 152 force the pairs of jaws 190 toward each other. Thus, rotating disks 150 are forced onto body portion 86 by locking springs 156. This maintains head portion 84 between the pairs of rotating jaws 190 and inhibits the movement of cart latch fixture 82 within locking mechanism 148 as long as transfer cart assembly 50 is not forced away from processing station 138. In addition, docking pads 88 meet respective slanted surfaces 145 of locking assembly housing 146.

Further, when cart latch fixture 82 is pushed between the pairs of rotating jaws 190, cart latch fixture 82 imparts force on anti-return rod 158 of anti-return mechanism 144, which is positioned between the pairs of rotating jaws 190. The force imparted by cart latch fixture 82 pushes anti-return rod 158 toward rear surface 134 of end 140, thereby serving to move anti-return case 160 on anti-return bolts 162 toward rear surface 134 of end 140. The movement of anti-return case 160 serves to compress anti-return springs 166, which are respectively positioned on anti-return bolts 162 between anti-return case 160 and rear surface 134 of end 140.

Specifically with respect to the operation of anti-return pins 176, in a so-called resting position, when anti-return case 160 is not being forced by anti-return rod 158 to compress anti-return springs 166 toward rear surface 134 of end 140, anti-return case 160 serves to compress pin springs 178 as each of pin heads 177 is positioned on upper edge 170 of anti-return case 160 and forced upward against the biasing of pin springs 178. This upward force of pin heads 177 results in an upward protrusion of anti-return pins 176 from upper surface 184 of end 140. If movable rack assembly 2 is positioned in processing station 138 when pin heads 177 are in contact with upper edge 170 of anti-return case 160, anti-return pins 176 project upwardly from upper surface 184 of end 140 such as to inhibit movable rack assembly 2 from being removed from or sliding out of processing station 138.

However, when anti-return case 160 is being forced by anti-return rod 158 to slide on bolts 162 toward rear surface 134 of end 140 to compress anti-return springs 166, pin springs 178 expand as the movement of anti-return case 160 toward rear surface 134 of end 140 moves contact between corresponding pin heads 177 of anti-return pins 176 and anti-return case 160 from upper edge 170 of anti-return case 160 to tapered surface 172 of anti-return case 160. Further movement of anti-return case 160 toward rear surface 134 moves contact between corresponding pin heads 177 of anti-return pins 176 and anti-return case 160 from tapered surface 172 of anti-return case 160 to lower surface 174 of anti-return case 160. This reduces the protrusion of anti-return pins 176 from upper surface 184 of end 140, which deactivates anti-return mechanism 144 and enables removal of movable rack assembly 2 from processing station 138 or transfer of movable rack assembly 2 to processing station 138.

It is additionally noted that, when movable rack assembly 2 is not positioned in processing station 138 and anti-return case 160 is not being forced by anti-return rod 158 to reduce the protrusion of anti-return pins 176 from upper surface 184 of end 140, the protrusion of anti-return pins 176 inhibits the transfer of movable rack assembly 2 into processing station 138 from transfer cart assembly 50 or via any other means.

Thus, to reduce protrusion of anti-return pins 176 from upper surface 184 of end 140, anti-return rod 158, and subsequently anti-return case 160, must be forced toward rear surface 134 of end 140 by either transfer cart assembly 50 or some other compatible mechanical means. Such mechanical means could even potentially include a human actuation of anti-return rod 158, and subsequently anti-return case 160.

While movable rack assembly 2 is secured within processing station 138, support frame 44 of movable rack assembly 2 is positioned on wheels 186 of processing station 138. When movement of movable rack assembly 2 with respect to end 140 of processing station 138 is enabled, support frame 44 is enabled to roll on wheels 186 of processing station 138 such that movable rack assembly 2 can be transferred onto rollers 70 of transfer cart assembly 50.

When movable rack assembly 2 is in the process of being moved out of processing station 138 and toward rear lateral wall 62 of transfer cart assembly 50 via rollers 70 of transfer cart assembly 50, support frame 44 contacts and pushes down on upper taper portion 64 of latch taper section 126 of rack latch 102. As support frame 44 is moved further toward rear lateral wall 62, the pressure applied by movable rack assembly 2 to upper taper portion 64 forces upper taper portion 64 to rotate downward. Further, the pressure applied by movable rack assembly 2 to upper taper portion 64 forces latch bar sections 120 and rack latch bar 104 to rotate upward away from latch bar stop 116 via rotation of rack latches 102. When support frame 44 is moved past rear edge 127 of latch taper section 126 and into latch notch section 124, pressure is no longer exerted on upper taper portion 64. As a result, rack latch 102 rotates back to its resting position with latch bar sections 120 resting on latch bar stop 116. This serves to lock support frame 44 within latch notch section 124 between rear edge 127 of latch taper section 126 and forward edge 129 of block projection 128, thereby locking movable rack assembly 2 on transfer cart assembly 50.

When transfer cart assembly 50 is removed from docking with processing station 138, force on anti-return rod 158 is removed, allowing expansion of anti-return springs 166 to return anti-return case 160 and anti-return rod to their resting position. As a result, the positioning of anti-return pins 176 are subsequently affected as pin heads 177 slide from lower surface 174 of anti-return case 160 to tapered surface 172 and eventually to upper edge of anti-return case 160, thereby serving to force anti-return pins 176 to protrude upward from upper surface 184 of end 140. Further, locking springs 156 force locking arms 152 and the pairs of rotating jaws 190 to return to resting positions.

In addition, force is withdrawn from push member 90, thereby allowing cart spring 96 to force push member 90 away from front lateral wall 60 of transfer cart assembly 50 and push rod 92 away from rear lateral wall 62 of transfer cart assembly 50. The movement of push rod 92 away from rear lateral wall 62 results in the movement of hook apparatus 98 forward to secure rack latch bar 104 within hook 130, thereby securing movable rack assembly 2 to transfer cart assembly 50.

When it is desired to transfer movable rack assembly 2 from transfer cart assembly 50 to processing station 138, corresponding interactions occur between transfer cart assembly 50 and processing station 138. Initially, movable rack assembly 2 is locked on transfer cart assembly 50, as support frame 44 of movable rack assembly 2 is locked within latch notch section 124 between rear edge 127 of latch taper section 126 and forward edge 129 of block projection 128. As transfer cart assembly 50 is progressively pushed toward processing station 138, push member 90 of transfer cart assembly 50 contacts front surface 136 of end 140 and is forced toward front lateral wall 60. As a result, push rod 92 is forced to move toward rear lateral wall 62, thereby serving to compress cart spring 96. Rearward movement of push rod 92 also rearwardly moves hook 130. Hook 130 is removed from around rack latch bar 104 and, therefore, no longer secures rack latch bar 104 therewithin, thereby being allowed to freely move according to the rotation of latch bar sections 120 by rack latches 102.

Thereafter, the unlocking of support frame 44 from within latch notch section 124 is achieved by exerting force on movable rack assembly 2 toward front lateral wall 60. The movement of movable rack assembly 2 toward front lateral wall 60 causes the portions of support frame 44 positioned within respective latch notch sections 124 to exert force on rear edges 127 of latch taper sections 126. As a result, latch taper sections 126 are forced to downwardly rotate toward upper tray 80. Further, rack latch bar 104 is forced to upwardly rotate away from latch bar stops 116. The downward rotation of latch taper section 126 allows support frame 44 to move into contact with upper taper portion 64 of latch taper section 126, thereby serving to unlock support frame 44 from rack latch 102 and permit free movement of support frame 44 on rollers 70 of transfer cart assembly 50.

The progressive push of transfer cart assembly 50 toward processing station 138 also serves to push cart latch fixture 82 through housing aperture 192 and into contact with rotating disks 150 of locking mechanism 148. Rotating disks 150 are subsequently forced by head portion 84 of cart latch fixture 82 to rotate around respective disk pins 182 as pressure is placed on rotating disks 150 by the contour of head portion 84. Further, since rotating disks 150 are attached to ends of respective pairs of rotating jaws 190, the force applied to rotating disks 150 causes the pairs of rotating jaws 190 to rotate away from each other on respective jaw pins 188. The forced rotation of the pairs of rotating jaws 190 serves to force respective locking arms 152 to compress locking springs 156.

As cart latch fixture 82 is further pushed inward, rotating disks 150 continue rotating until eventually clearing head portion 84 and rolling onto body portion 86 of cart latch fixture 82. Body portion 86 is narrower than head portion 84, thereby reducing the force applied to rotating disks 150. As a result, locking springs 156 are able to expand, and locking arms 152 force the pairs of jaws 190 toward each other. Thus, rotating disks 150 are forced onto body portion 86 by locking springs 156. This maintains head portion 84 between the pairs of rotating jaws 190 and inhibits the movement of cart latch fixture 82 within locking mechanism 148 as long as transfer cart assembly 50 is not forced away from processing station 138. In addition, docking pads 88 meet respective slanted surfaces 145 of locking assembly housing 146.

Further, when cart latch fixture 82 is pushed between the pairs of rotating jaws 190, cart latch fixture 82 imparts force on anti-return rod 158, which is positioned between the pairs of rotating jaws 190. The force imparted by cart latch fixture 82 pushes anti-return rod 158 toward rear surface 134 of end 140, thereby serving to move anti-return case 160 on anti-return bolts 162 toward rear surface 134 of end 140. The movement of anti-return case 160 serves to compress anti-return springs 166, which are respectively positioned on anti-return bolts 162 between anti-return case 160 and rear surface 134 of end 140.

When anti-return case 160 is forced by anti-return rod 158 to slide on bolts 162 toward rear surface 134 of end 140 to compress anti-return springs 166, pin springs 178 expand as corresponding pin heads 177 extend to contact tapered surface 172 of anti-return case 160 and move toward eventual contact with lower surface 174 of anti-return case 160. This reduces the protrusion of anti-return pins 176 from upper surface 184 of end 140. As support frame 44 has been permitted to freely move on rollers 70 of transfer cart assembly 50, the protrusion reduction of anti-return pins 176 from upper surface 184 of end 140 permits movable rack assembly 2 to be transferred from rollers 70 of transfer cart assembly 50 onto wheels 186 of processing station 138.

After movable rack assembly 2 has been transferred to processing station 138, transfer cart assembly 50 can be removed from docking with processing station 138. Because of such removal, force on anti-return rod 158 is also removed, allowing expansion of anti-return springs 166 to return anti-return case 160 and anti-return rod 158 to their resting position. As a result, the positioning of anti-return pins 176 are subsequently affected as pin heads 177 slide from lower surface 174 of anti-return case 160 to tapered surface 172 and eventually to upper edge of anti-return case 160. Thus, anti-return pins 176 are forced to protrude upward from upper surface 184 of end 140, thereby serving to inhibit movement of movable rack assembly 2 within processing station 138. Further, locking springs 156 force locking arms 152 and the pairs of rotating jaws 190 to return to resting positions.

In addition, force is withdrawn from push member 90, thereby allowing cart spring 96 to force push member 90 away from front lateral wall 60 of transfer cart assembly 50 and push rod 92 away from rear lateral wall 62 of transfer cart assembly 50. The movement of push rod 92 away from rear lateral wall 62 results in the movement of hook apparatus 98 forward to secure rack latch bar 104 within hook 130.

Figure 16:
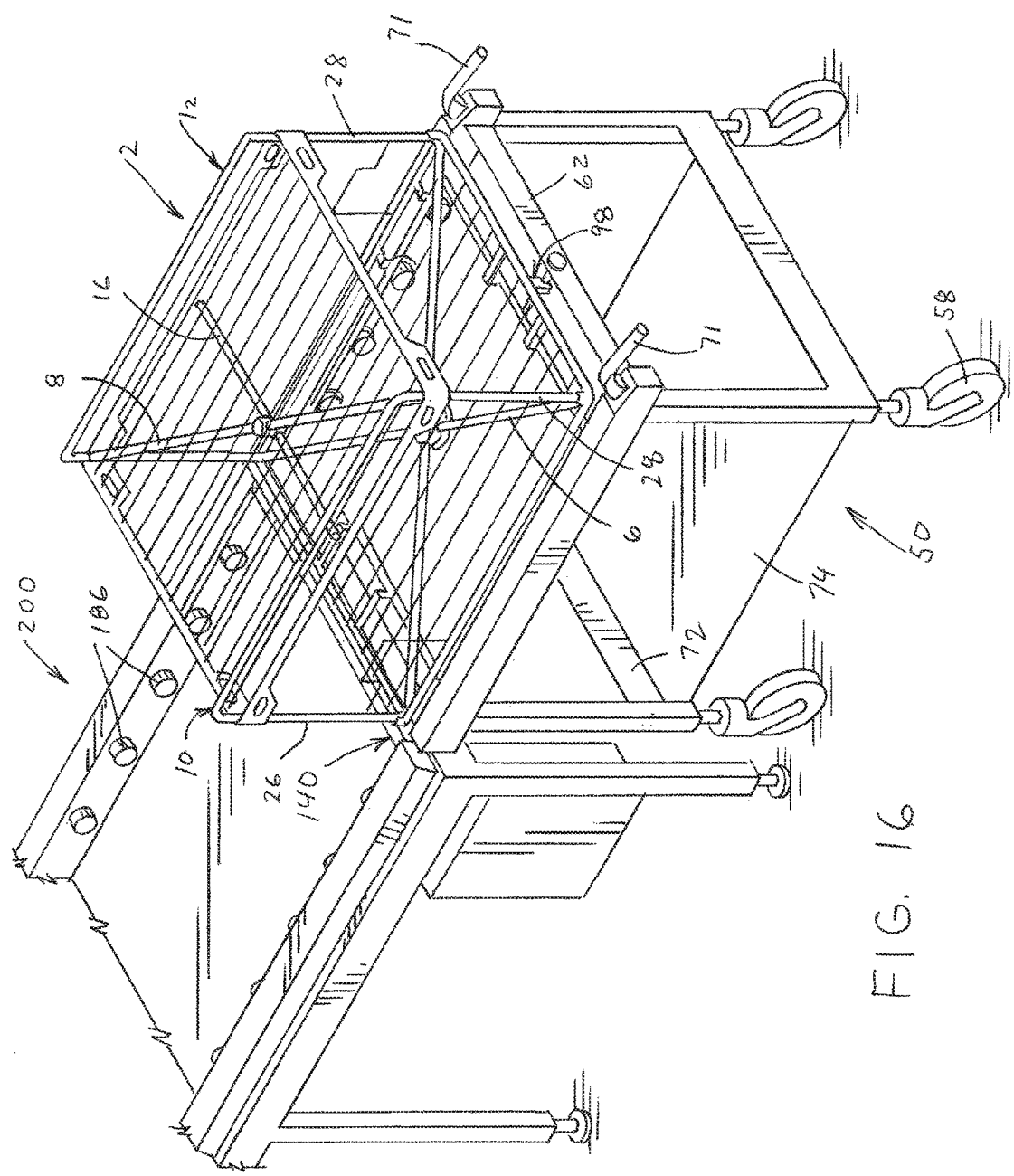
FIG. 16 is a perspective view illustrating a conveyor station to be used with the transfer cart assembly illustrated in FIG. 2 and the movable rack assembly illustrated in FIG. 1, when docking between the transfer cart assembly and the conveyor station is to occur or has occurred.

The system disclosed herein is not specifically limited to fluid circulation applications. It is noted that the system described herein can be used with one of many apparatuses for which the transportation, the transfer, and the receipt of a rack such as movable rack assembly 2 is desired. For example, FIG. 16 is a perspective view illustrating conveyor station 200 to be used for conveying transfer cart assembly 50 and movable rack assembly 2, when docking between transfer cart assembly 50 and conveyor station 200 is to occur or has occurred. Cart locking assembly 142 and anti-return mechanism 144 of processing station 138 can be similarly incorporated into conveyor station 200. As such, the interaction between transfer cart assembly 50 and conveyor station 200 can substantially correspond with aforementioned interaction between transfer cart assembly 200 and processing station 138.

The foregoing descriptions are example embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A system for transporting a movable rack assembly and transferring said movable rack assembly between a transfer cart assembly and a station, the transfer cart assembly being configured to transport the movable rack assembly to the station, transfer the movable rack assembly to the station, and receive the movable rack assembly from the station, the system comprising:

a rack support assembly integrated into the transfer cart assembly, the rack support assembly being configured to securely and movably support the movable rack assembly thereon;

a rack locking assembly integrated into the transfer cart assembly, the rack locking assembly being configured to lock the movable rack assembly to the rack support assembly;

a docking enabling assembly integrated into the transfer cart assembly, the docking enabling assembly being configured to enable temporary docking of the transfer cart assembly with the station for the transfer of the movable rack assembly to the station or the receipt of the movable rack assembly from the station;

a cart locking assembly integrated into the station, the cart locking assembly being configured to interact with the docking enabling assembly to temporarily secure the transfer cart assembly to the station for the transfer of the movable rack assembly to the station or the receipt of the movable rack assembly from the station; and an anti-return mechanism integrated into an end of the station, the anti-return mechanism being configured to actively inhibit removal of the movable rack assembly from the station or transfer of the movable rack assembly to the station when the transfer cart assembly is not temporarily secured to the station, wherein, when the transfer cart assembly is temporarily secured to the station, the transfer cart assembly causes the anti-return mechanism to deactivate to allow for the transfer of the movable rack assembly from the transfer cart assembly to the station or the receipt of the movable rack assembly from the station by the transfer cart assembly, and wherein, when the transfer cart assembly is temporarily secured to the station, the rack locking assembly is unlocked to allow for the transfer of the movable rack assembly to the station or the receipt of the movable rack assembly from the station.

2. The system according to claim 1, wherein the rack support assembly is at least partially defined by two side rails parallel to each other and two lateral walls parallel to each other, the two lateral walls respectively extending between front and rear areas of said two side rails and connecting said two side rails therebetween, and wherein the rack locking assembly comprises rack latches rotatably attached to respective inner surfaces of said side rails, the rack latches being configured to lock the movable rack assembly to the rack support assembly.

3. The system according to claim 2, wherein the rack latches respectively comprise latch notch sections that are dimensioned to accept respective portions of the movable rack assembly and configured to inhibit movement of the movable rack assembly when said respective portions of the movable rack assembly are positioned within said lack notch sections.

4. The system according to claim 3, wherein the latch notch sections are respectively partially defined by mounting blocks correspondingly disposed on said inner surfaces of said side rails, the rack latches being respectively mounted on said mounting blocks.

5. The system according to claim 4, wherein the latch notch sections are respectively partially defined further by latch taper sections of said rack latches, said latch taper sections being respectively disposed on opposite sides of said latch notch sections from said mounting blocks.

6. The system according to claim 2, wherein the rack locking assembly further comprises a rack latch bar, a hook apparatus, and a push rod, said rack latch bar extending between said rack latches, said hook apparatus comprising a hook that is structurally shaped to secure the rack latch bar therewithin and configured to inhibit the rack latch bar and the rack latches from moving, said hook apparatus being secured to said push rod, said push rod extending from a front of the front lateral wall, through the front lateral wall and the hook apparatus, and to the rear lateral wall.

7. The system according to claim 6, wherein, when pressure is applied to said push rod to move said push rod toward the rear lateral wall, the hook apparatus moves with the push rod, thereby serving to disengage the hook from securing the rack latch bar to allow the rack latch bar and the rack latches to move, and wherein, when no pressure is applied to said push rod, the hook apparatus is positioned such that the rack latch bar is secured within the hook.

8. The system according to claim 4, wherein the rack locking assembly further comprises a rack latch bar, a hook apparatus, and a push rod, said rack latch bar extending between said rack latches, said hook apparatus comprising a hook that is structurally shaped to secure the rack latch bar therewithin and configured to inhibit the rack latch bar and the rack latches from moving, said hook apparatus being secured to said push rod, said push rod extending from a front of the front lateral wall, through the front lateral wall and the hook apparatus, and to the rear lateral wall.

9. The system according to claim 8, wherein, when pressure is applied to said push rod to move said push rod toward the rear lateral wall and the movable rack assembly is locked in the rack latches, the hook apparatus moves with the push rod, thereby serving to disengage the hook from securing the rack latch bar to allow the rack latch bar and the rack latches to move, thereby allowing the rack latches to release the movable rack assembly from being locked within the latch notch sections and receive the moveable rack assembly unlocked on the latch taper sections, and wherein, when no pressure is applied to said push rod, the hook apparatus is positioned such that the rack latch bar is secured within the hook.

10. The system according to claim 1, wherein the anti-return mechanism comprises an anti-return rod, an anti-return case, and anti-return pins, the anti-return rod extending from the end of the station and being fixed to the anti-return case, the anti-return case having an upper edge, a tapered surface, and a lower surface, the anti-return pins being in contact with the upper edge of the anti-return case and protruding from an upper surface of the end of the station to actively inhibit removal of the movable rack assembly from the station or transfer of the movable rack assembly to the station when no force is applied to the anti-return case, and wherein, when the transfer cart assembly is temporarily secured to the station, the transfer cart assembly imparts force to the anti-return rod to force the anti-return case toward the rear surface of the end of the station and move contact between the anti-return pins and the anti-return case from the upper edge of the anti-return case to the lower surface of the anti-return case via the tapered surface of the anti-return case, thereby reducing protrusion of the anti-return pins from the upper surface of the end of the station to enable removal or insertion of the movable rack assembly from the station.

11. A transfer cart assembly for transporting, transferring, and receiving a movable rack assembly, the transfer cart assembly comprising:

a rack support assembly configured to support the movable rack assembly for transport thereof and enable movement of the movable rack assembly for transfer or receipt thereof, the rack support assembly comprising two side rails extending parallel to each other, the side rails having respective inner surfaces connected by front and rear lateral walls at corresponding ends of the side rails; and a rack locking assembly configured to lock the movable rack assembly onto the rack support assembly, the rack locking assembly comprising:

rack latches respectively disposed facing each other on the inner surfaces of the side rails, the rack latches being configured to lock the movable rack assembly to the rack support assembly;

a rack latch bar extending between the rack latches to control an orientation of the rack latches;

a hook apparatus comprising a hook that is structurally shaped to secure the rack latch bar therewithin; and a push rod extending through the front lateral wall and the hook apparatus, and into the rear lateral wall within which a cart spring is applied to the push rod, the hook apparatus being fixed to the push rod, the push rod comprising a push member connected thereto ahead of the front lateral wall, the push rod being configured to move the hook apparatus toward the rear lateral wall when pressure applied to the push member forces the push rod toward the rear lateral wall to compress the cart spring, thereby removing the hook of the hook apparatus from around the rack latch bar and allowing the rack latches to release the movable rack assembly in a locked state therefrom or receive the movable rack assembly in an unlocked state thereon.

12. The transfer cart assembly according to claim 11, wherein the rack support assembly further comprises a plurality of rollers mounted on each of said inner surfaces of said side rails to face each other, the rollers being configured to enable movement of the movable rack assembly for the transfer or receipt thereof when the movable rack assembly is not locked onto the rack support assembly.

13. The transfer cart assembly according to claim 12, wherein respective uppermost portions of the rollers are positioned to define a continuous plane below a top portion of the side rails.

14. The transfer cart assembly according to claim 11, wherein each of the rack latches is mounted on and rotatably secured to a mounting block disposed on the inner surface of one of the side rails, wherein each of the rack latches includes a latch bar section to which the rack latch bar is connected, and wherein, when the hook is removed from around the rack latch bar, the rack latch bar is allowed to freely move according to a rotation of the latch bar sections by the rack latches.

15. The transfer cart assembly according to claim 11, wherein each of the rack latches is mounted on and rotatably secured to a mounting block disposed on the inner surface of one of the side rails, wherein each of the rack latches comprises a latch notch section at least partially defined by the mounting block and a latch taper section of the rack latches, and wherein each of the latch notch sections is dimensioned to be filled by a portion of said movable rack assembly to inhibit lateral, forward, and rearward movement of the movable rack assembly when the rack latch bar is secured within the hook.

* * * * *